US011368307B1

(12) United States Patent
Ozarkar et al.

(10) Patent No.: US 11,368,307 B1
(45) Date of Patent: Jun. 21, 2022

(54) TAMPER-RESISTANT, MULTIPARTY LOGGING AND LOG AUTHENTICITY VERIFICATION

(71) Applicant: Equinix, Inc., Redwood City, CA (US)

(72) Inventors: Anand Ozarkar, San Jose, CA (US); Srinivasan Raghavan, Singapore (SG); Imam Sheikh, Redwood City, CA (US); Ankur Sharma, Sunnyvale, CA (US)

(73) Assignee: Equinix, Inc., Redwood City, CA (US)

( * ) Notice: Subject to any disclaimer, the term of this patent is extended or adjusted under 35 U.S.C. 154(b) by 94 days.

(21) Appl. No.: 16/696,340

(22) Filed: Nov. 26, 2019

Related U.S. Application Data

(60) Provisional application No. 62/848,270, filed on May 15, 2019.

(51) Int. Cl.
*H04L 9/32* (2006.01)
*H04L 9/06* (2006.01)

(52) U.S. Cl.
CPC .......... *H04L 9/3218* (2013.01); *H04L 9/0643* (2013.01); *H04L 9/321* (2013.01); *H04L 9/3247* (2013.01); *H04L 9/3263* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 9,886,267 B2 | 2/2018 | Maheshwari et al. | |
| 9,948,552 B2 | 4/2018 | Teng et al. | |
| 10,129,078 B2 | 11/2018 | Kumar et al. | |
| 10,419,209 B1 * | 9/2019 | Griffin | H04L 9/3263 |
| 2020/0076615 A1 * | 3/2020 | Redpath | H04L 9/3221 |
| 2020/0186355 A1 * | 6/2020 | Davies | H04L 9/3218 |
| 2020/0322128 A1 * | 10/2020 | Hu | H04L 9/0637 |
| 2020/0328892 A1 * | 10/2020 | Gangal | H04L 9/0825 |

OTHER PUBLICATIONS

Bitfury "On Blockchain Auditability" [online] Bitfury Group, Nov. 14, 2016 [retrieved Sep. 29, 2021], Retrieved from the Internet: URL: https://bitfury.com/content/downloads/bitfury_white_paper_on_blockchain_auditability.pdf (Year: 2016).*
Reed et al., "Decentralized Identifiers (DIDs) v0.13," w3.org, Aug. 10, 2019, 49 pp.
U.S. Appl. No. 16/006,458, filed Jun. 12, 2018, by Teng et al.
Rosen et al., "BGP/MPLS IP Virtual Private Networks (VPNs)," Network Working Group, RFC 4364, Feb. 2006, 47 pp.
Schneier et al., "Secure Audit Logs to Support Computer Forensics," ACM Transactions on Information Systems Security, vol. 2, No. 2, May 1999, 12 pp.

(Continued)

*Primary Examiner* — Taghi T Arani
*Assistant Examiner* — Joshua Raymond White
(74) *Attorney, Agent, or Firm* — Shumaker & Sieffert, P.A.

(57) ABSTRACT

In general, techniques are described for using zero-knowledge proofs and digital signatures to verify the authenticity of log records generated by multiple parties, at least in some cases without exposing personally identifiable information for the parties.

19 Claims, 12 Drawing Sheets

(56) References Cited

OTHER PUBLICATIONS

Holt, "Logcrypt Forward Security and Public Verification for Secure Audit Logs," Proceedings of the 2006 Australasian Workshops on Grid Computing and E-Research, vol. 54, Jan. 2006, 9 pp.
Kelsey et al., "Signed Syslog Messages," Internet Engineering Task Force (IETF), RFC 5848, May 2010, 40 pp.
Ma et al., "A New Approach to Secure Logging," ACM Transactions on Storage, vol. 5, No. 1, Mar. 2009, 20 pp.
Buldas et al., "Efficient Record-Level Keyless Signatures for Audit Logs," Nordic Conference on Secure IT Systems, Oct. 15-17, 2014, 13 pp.
"Zero-Knowledge Proof," Wikipedia, the free encyclopedia, retrieved from https://en.wikipedia.org/wiki/Zero-knowledge_proof, last edit made on Mar. 6, 2020, 12 pp.
Schor, "On Zero-Knowledge Proofs in Blockchains," medium.com, Mar. 23, 2018, 3 pp.
Potter, "ZCash Advances Zero Knowledge Proofs," blog.xtrabytes.global, Jul. 31, 2018, 3 pp.
Del Castillo, "JPMorgan Integrates Zcash Privacy Tech Into Quorum Blockchain," coindesk.com, Oct. 18, 2017, 2 pp.
Ben-Sasson et al., "Zerocash: Decenlralized Anonymous Payments from Bitcoin," 2014 IFFF Symposium on Security and Privacy, May 18-21, 2014, pp. 459-474.
Voell et al., "Quorum Whitepaper v0.1," available at https://github.com/jpmorganchase/quorum-docs/blob/master/Quorum%20Whitepaper%20v0.1.pdf, Nov. 22, 2016, 8 pp.
Diamond, "ZSL Proof of Concept," available at https://github.com/jpmorganchase/quorum/wiki/ZSL, Dec. 17, 2018, 6 pp.

\* cited by examiner

TAMPER-RESISTANT, MULTIPARTY LOGGING AND LOG AUTHENTICITY VERIFICATION

This application claims the benefit of U.S. Provisional Application No. 62/848,270, filed May 15, 2019, which is hereby incorporated by reference herein in its entirety.

TECHNICAL FIELD

This disclosure relates to computing systems, and more specifically, to logging services for computer applications.

BACKGROUND

Securing system logs for information technology (IT) systems and applications is important for assuring the integrity of transaction records. In general, logs record past events such as transactions, user events, application events, computing system statuses, and changes to data. The integrity of a log having one or more records of activity is maintained when the log remains an accurate reflection of the transactions represented in the records because no fake data is inserted, no records are modified or delegated, and the records are not reordered. A log record is authentic when it is generated by the expected party. The integrity and authenticity of a log record should be provable to parties to a transaction represented in the log record.

SUMMARY

In general, techniques are described for using zero-knowledge proofs and digital signatures to verify the authenticity of log records generated by multiple parties, at least in some cases without exposing personally identifiable information for the parties. For example, a trusted third-party, such as a regulator, may assign a decentralized identifier (DID) and a public key to a party that participates in a log verification system deployed by a provider. The party may further obtain, e.g., from the trusted third-party, credentials including a verification key and a proving key, which are associated by the trusted third-party with the DID and public key assigned to the party. The trusted third-party may store these items and credentials to an identity store. The trusted third-party may assign DIDs to multiple such parties that participate in or otherwise use the log verification system. The party generates log records of transactions between the party and other parties and sends these log records to the log verification system along with a zero-knowledge proof generated by the party using the proving key. The proof may be generated once by the party or sent by the party to the log verification system with each log record. The log verification system may not store personally-identifying information for the party, such as the DID or the public key for the party.

Multiple parties may generate log records in this way. The log verification system attaches the corresponding party proofs to the log records and may combine multiple log records and corresponding proofs into a log block of log records, which stores multiple such log records and corresponding proof from multiple separate parties. In this way, each proof generated by a party attests to the authenticity of a corresponding log record generated by the party, because only the party having the DID (i.e., the party) can generate the proof. The log verification system may also time stamp each log record. The log verification system hashes the log block and may submit the log block to be signed by the trusted third-party. The log verification system stores the log block or signed log block, and the hash. The log block may be stored as a block in a chain, such as a block in a Merkle tree.

To verify the authenticity of a log record, the log verification system obtains the log block and may submit the log block for signature verification by the trusted third-party. The log verification system sends the proof for the party that generated the log record to the trusted third-party for authenticity verification. Using the verification key for the party, which the trusted third-party may look up using the proof or public key for the party, along with the public key for the party and the proof, the trusted third-party computes the zero-knowledge proof verification algorithm to evaluate whether the proof attests that the party computed the proof using the party DID. The regulator may output an indication of whether the log record is authentic.

The techniques may provide one or more technical advantages for realizing at least one practical application. For example, by consolidating log records for multiple different parties of a log verification system provider into log blocks, the techniques may facilitate a low-latency log record verification scheme by avoiding a computationally expensive per-record signing scheme while still being tamper-resistant and permitting efficient log record extraction from multi-party log blocks. As another example, the techniques facilitate anonymity for parties by separating the personally-identifiable information for a party from the log verification system provider. While verification requests are made to the log verification system, the log verification system may not store the personally-identifiable information and instead anonymizes the log records by appending the proof and, in some cases, a public key used to generate the proof. The party receives credentials for generating the proof directly from the trusted third-party. The techniques may also have advantages over hashed chains. For example, the techniques may avoid the cost of generating per-record signatures as well as overhead associated with key management. The techniques may also preserve granularity of the log records in a multiparty/multiparty environment where ordering cannot be done based on time due to synchronous generation of logs by multiple parties, in contrast to hashed chain-based techniques.

In some examples, a method includes receiving, by a log verification system, a first log record for a first party and a first zero-knowledge proof for the first party; receiving, by the log verification system, a second log record for a second party and a second zero-knowledge proof for the second party; generating, by the log verification system, a log block comprising the first log record in association with the first zero-knowledge proof and the second log record in association with the second zero-knowledge proof; storing, by the log verification system, a signed log block comprising the log block in association with a digital signature for the log block; verifying an authenticity of the first log record using the first zero-knowledge proof and credentials for the first party, wherein the credentials for the first party were used to generate the first zero-knowledge proof; and outputting an indication of whether the first log record is authentic.

In some examples, a computing system comprises a log verification system comprising first processing circuitry coupled to first memory, the log verification system configured to: receive a first log record for a first party and a first zero-knowledge proof for the first party; receive a second log record for a second party and a second zero-knowledge proof for the second party; generate a log block comprising the first log record in association with the first zero-knowledge proof and the second log record in association with the second zero-knowledge proof; and store a signed log block comprising the log block in association with a digital signature for the log block, the computing system further comprising: a trusted third-party computing system comprising second processing circuitry coupled to second memory, the trusted third-party computing system configured to: verify an authenticity of the first log record using the first zero-knowledge proof and credentials for the first party, wherein the credentials for the first party were used to generate the first zero-knowledge proof; and output an indication of whether the first log record is authentic.

In some examples, a computer-readable storage medium is configured with instructions for causing a computing system to: receive, by a log verification system of the computing system, a first log record for a first party and a first zero-knowledge proof for the first party; receive, by the log verification system, a second log record for a second party and a second zero-knowledge proof for the second party; generate, by the log verification system, a log block comprising the first log record in association with the first zero-knowledge proof and the second log record in association with the second zero-knowledge proof; store, by the log verification system, a signed log block comprising the log block in association with a digital signature for the log block; verify an authenticity of the first log record using the first zero-knowledge proof and credentials for the first party, wherein the credentials for the first party were used to generate the first zero-knowledge proof; and output an indication of whether the first log record is authentic.

Also described are a computing system configured to perform any of the methods described in this disclosure, a computing system having means for performing any of the methods described in this disclosure, and computer-readable storage media configured with instructions for causing a computing system to perform any of the methods described in this disclosure.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

Like reference characters denote like elements throughout the figures and text.

DETAILED DESCRIPTION

Figure 1:
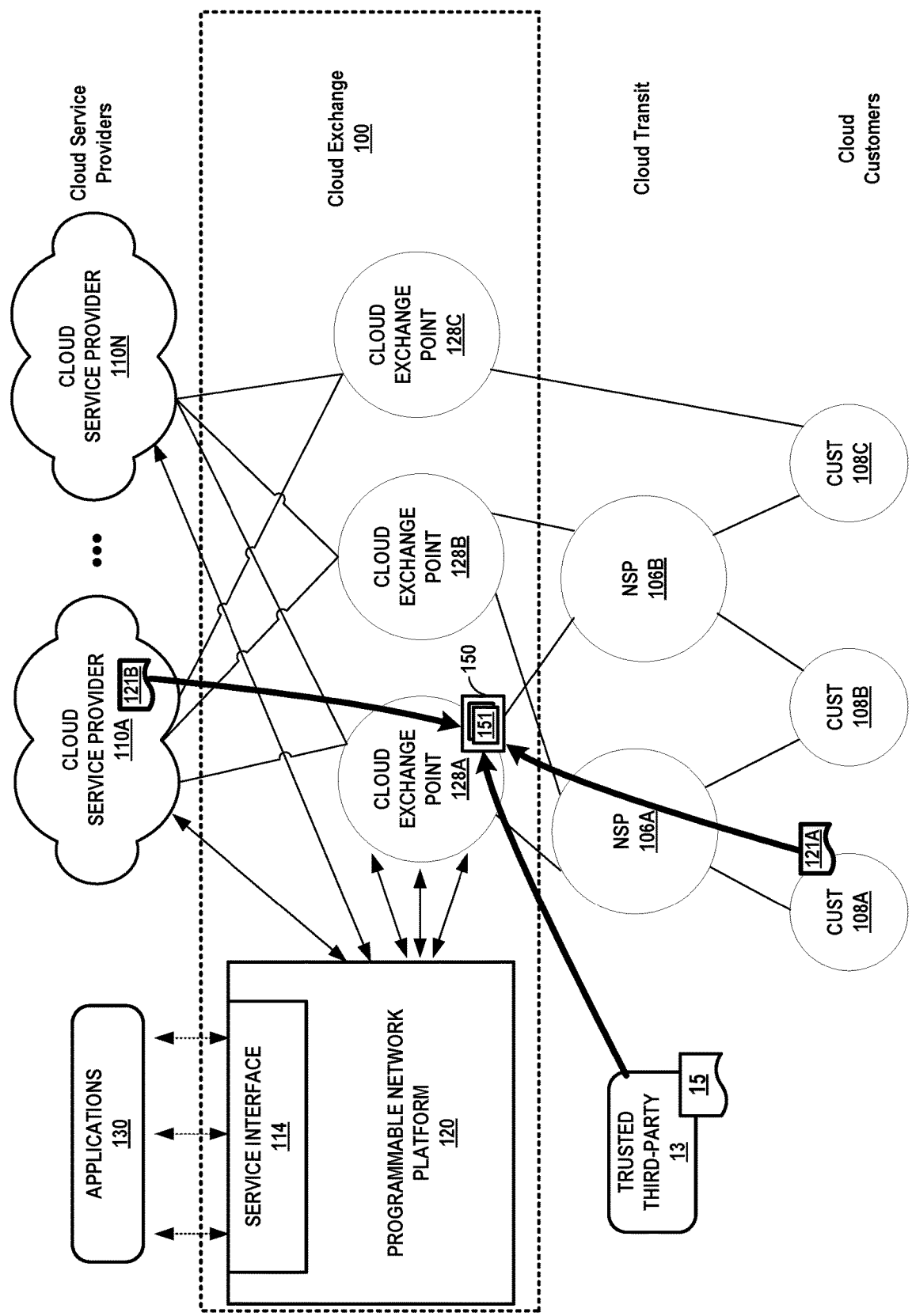
FIG. 1 illustrates a conceptual view of a network system having a log verification system and a cloud exchange that provides multiple cloud exchange points according to techniques described herein.

One-time key-based signing involves a log protection scheme that encrypts the records using one-time keys and links them using cryptographic hash functions. The scheme allows both for verification of the integrity of the whole log and for selective disclosure of the one-time encryption keys. However, it needs a third-party trusted by both the logger and the verifier and requires active participation of this trusted party in both phases of the protocol.

Asymmetric key-based signing involves replacing the symmetric cryptographic primitives used in one-time key-based signing with asymmetric ones and thus enabled verification without the trusted party. However, asymmetric key-based scheme requires public-key signatures on individual records, which adds high computational and storage overhead to the logging process. Also, the size of the information required to prove the integrity of one record is at least proportional to the square root of the distance of the record from the beginning of the log.

Other proposed amendments of the original protocol one-time key-based signing have similar weaknesses. Another scheme involves a log signing scheme where records are signed in blocks, by first computing a hash value of each record in a block and then signing the sequence of hash values. This enables efficient verification of the integrity of the whole block, significantly reduces the overhead compared to having a signature per record and removes the need to ship the whole log block when a single record is needed as evidence. But still the size of the proof of a record is linear in the size of the block. Also, other records in the same block are not protected from the informed brute-force attack.

Forward-Secure Sequential Aggregate involves an authentication technique that includes constructing a logging protocol which provides forward-secure stream integrity, retaining the provable security of the underlying primitives. This scheme may involve storing individual signatures in the log file to gain better signature granularity, at the expense of storage efficiency. However, signer computation cost is significant per log entry, and the techniques of this disclosure are approximately two to three orders of magnitude faster in some examples.

Signing each record individually would, of course, have very high overhead in both processing and storage, as signing is quite expensive operation and the size of a signature may easily exceed the size of a typical log record. An improvement over both above naive strategies would be to compute a hash value of each record in a log block and then sign the sequence of hash values instead of the records themselves. Merkle Tree Based Signing may use this improvement. Merkel Tree with blinding masks recognizes that a typical log record may contain insufficient entropy—an attacker who knows the pattern of the input could exhaustively test all possible variants to find the one that yields the hash value in the chain and thus learn the contents of the record. To prevent this kind of informed brute-force attack, a blinding mask with sufficient entropy can be added.

Each of the above schemes requires, in order to provide per-log record granularity and protection, the high cost of generating the signature and associated key management. Signature are computationally expensive and associated key management are also difficult to maintain. In addition, using hashed chains and signing the entire block with one entity is not practicable in a multitenant environment because granularity is lost, and ordering based on time cannot be done, for in the same time t multiple parties (tenants/customers/providers) would be generating the logs.

FIG. 1 illustrates a conceptual view of a network system having a log verification system and a cloud exchange that provides multiple cloud exchange points according to techniques described herein. Each of cloud-based services exchange points 128A-128D (described hereinafter as "cloud exchange points" and collectively referred to as "cloud exchange points 128") of cloud-based services exchange 100 ("cloud exchange 100") may represent a different data center geographically located within the same metropolitan area ("metro-based," e.g., in New York City, N.Y.; Silicon Valley, Calif.; Seattle-Tacoma, Wash.; Minneapolis-St. Paul, Minn.; London, UK; etc.) to provide resilient and independent cloud-based services exchange by which cloud-based services customers ("cloud customers") and cloud-based service providers ("cloud providers") connect to receive and provide, respectively, cloud services. In various examples, cloud exchange 100 may include more or fewer cloud exchange points 128. In some instances, a cloud exchange 100 includes just one cloud exchange point 128. As used herein, reference to a "cloud exchange" or "cloud-based services exchange" may refer to a cloud exchange point. A cloud exchange provider may deploy instances of cloud exchanges 100 in multiple different metropolitan areas, each instance of cloud exchange 100 having one or more cloud exchange points 128.

Each of cloud exchange points 128 includes network infrastructure and an operating environment by which cloud customers operating computing devices 108A-108C (collectively, "customer computing devices 108") receive cloud services from multiple cloud service provider networks 110A-110N (collectively, "cloud service providers 110" or "cloud service provider networks 110"). Customer computing devices 108A-108C may also referred to herein as simply customers 108A-108C (collectively "customers 108"). Cloud service provider networks 110A-110N may also referred to herein as simply cloud service providers 110A-110N (collectively "cloud service providers 110"). Customer computing devices 108 may be computing devices of corresponding customer networks co-located within the corresponding data center of one of cloud exchange points 128, or customer networks that receive services via transit network service providers 106, as illustrated in FIG. 1. Cloud exchange 100 provides customers of the exchange, e.g., enterprises, network carriers, network service providers, and SaaS customers, with secure, private, virtual connections to multiple cloud service providers (CSPs) globally. The multiple CSPs participate in the cloud exchange by virtue of their having at least one accessible port in the cloud exchange by which a customer can connect to the one or more cloud services offered by the CSPs, respectively. Cloud exchange 100 allows private networks of any customer to be directly cross-connected to any other customer at a common point, thereby allowing direct exchange of network traffic between the networks of the customers.

Cloud customers operating computing devices 108 may receive cloud-based services directly via a layer 3 peering and physical connection to one of cloud exchange points 128 or indirectly via one of network service providers 106A-106B (collectively, "NSPs 106," or alternatively, "carriers 106"). NSPs 106 provide "cloud transit" by maintaining a physical presence within one or more of cloud exchange points 128 and aggregating layer 3 access from one or more devices 108. NSPs 106 may peer, at layer 3, directly with one or more cloud exchange points 128 and in so doing offer indirect layer 3 connectivity and peering to one or more customer devices 108 by which customers (e.g., operating devices 108) may obtain cloud services from the cloud exchange 100. Each of cloud exchange points 128, in the example of FIG. 1, is assigned a different autonomous system number (ASN). For example, cloud exchange point 128A is assigned ASN 1, cloud exchange point 128B is assigned ASN 2, and so forth. Each cloud exchange point 128 is thus a next hop in a path vector routing protocol (e.g., BGP) path from cloud service providers 110 to customer devices 108. As a result, each cloud exchange point 128 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 110 to customers. In other words, cloud exchange points 128 may internalize the eBGP peering relationships that cloud service providers 110 and customers would maintain on a pair-wise basis. Instead, a customer may configure a single eBGP peering relationship with a cloud exchange point 128 and receive, via the cloud exchange, multiple cloud services from one or more cloud service providers 110. While described herein primarily with respect to eBGP or other layer 3 routing protocol peering between cloud exchange points and customer, NSP, or cloud service provider networks, the cloud exchange points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, one customer may have contracted with a cloud exchange provider for cloud exchange 100 to directly access layer 3 cloud services via cloud exchange points 128C. In this way, that customer receives redundant layer 3 connectivity to cloud service provider 110A, for instance. The customer at device 108C, in contrast, is illustrated as having contracted with the cloud exchange provider for cloud exchange 100 to directly access layer 3 cloud services via cloud exchange point 128C and also to have contracted with NSP 106B to access layer 3 cloud services via a transit network of the NSP 106B. A customer at device 108B is illustrated as having contracted with multiple NSPs 106A, 106B to have redundant cloud access to cloud exchange points 128A, 128B via respective transit networks of the NSPs 106A, 106B. The contracts described above are instantiated in network infrastructure of the cloud exchange points 128 by L3 peering configurations within switching devices of NSPs 106 and cloud exchange points 128 and L3 connections, e.g., layer 3 virtual circuits, established within cloud exchange points 128 to interconnect cloud service provider 110 networks to NSPs 106 networks and customer networks, all having at least one port offering connectivity within one or more of the cloud exchange points 128.

In some examples, cloud exchange 100 allows a corresponding one of customers of any network service providers (NSPs) or "carriers" 106A-106B (collectively, "carriers 106") or other cloud customers including a customer operating device 108C to be directly connected, via a virtual layer 2 (L2) or layer 3 (L3) connection to any other customer network and/or to any of CSPs 110, thereby allowing direct exchange of network traffic among the customer networks and CSPs 110. The virtual L2 or L3 connection may be referred to as a "virtual circuit."

Carriers 106 may each represent a network service provider that is associated with a transit network by which network subscribers of the carrier 106 may access cloud services offered by CSPs 110 via the cloud exchange 100. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 100.

In this way, cloud exchange 100 streamlines and simplifies the process of partnering CSPs 110 and customers (via carriers 106 or directly) in a transparent and neutral manner. One example application of cloud exchange 100 is a co-location and interconnection data center in which CSPs 110 and carriers 106 and/or customers operating devices 108 may already have network presence, such as by having one or more accessible ports available for interconnection within the data center, which may represent any of cloud exchange points 128. This allows the participating carriers, customers, and CSPs to have a wide range of interconnectivity options within the same facility. A carrier/customer may in this way have options to create many-to-many interconnections with only a one-time hook up to one or more cloud exchange points 128. In other words, instead of having to establish separate connections across transit networks to access different cloud service providers or different cloud services of one or more cloud service providers, cloud exchange 100 allows customers to interconnect to multiple CSPs and cloud services.

In accordance with techniques described herein, log verification system 150 provides log record storage and verification services. Log verification system 150 may represent one or more real and/or virtual servers, which may execute one or more applications that receive log records of transactions from any of the customers 108 or CSPs 110 (hereinafter, "parties"), store the log records to log store 151, and may subsequently submit the log records for verification of the authenticity of the log records, i.e., that a log record was generated by the putative party rather than an attacker. The log verification system 150 communicates with a trusted third-party 13 that may manage identities and cryptographic information for parties that use log verification system 150, may verify the data integrity of one or more log records, and also verifies the authenticity of individual log records. The cloud exchange provider may deploy log verification system to offer a vendor-neutral, centralized log verification service to customers 108 and cloud service providers 110. The log verification service in this example is therefore accessible via private channels, such as virtual circuits, that offer low-latency to customers 108 and cloud service providers 110. In some cases, the log verification system provider may be one of cloud service providers 110 or customers 108, or another party. Log verification system 150 in such cases may be deployed to a different network, i.e., other than cloud exchange point 128A.

Log verification system 150 and trusted third-party 13 use zero-knowledge proofs and digital signatures to verify the authenticity of the log records generated by multiple parties and stored to log store 151, without exposing personally identifiable information for the parties. For example, trusted third-party 13, which may represent a computing system controlled by a regulator or other neutral party, may assign a decentralized identifier (DID) and a public key to one of the parties. A DID is a verifiable, self-sovereign digital identify. Example description of DIDs is found in "Decentralized Identifiers (DIDs), Data Model and Syntaxes for Decentralized Identifiers (DIDs)," Version 0.12, W3C Community Group Report, Mar. 30, 2019, which is incorporated by reference herein in its entirety. A DID may be a randomly-generated string and have a corresponding public key for a party. The DID and public key may be generated by trusted third-party 13 and stored to identity store 15, which may represent an identity consortium chain. The DID and public key may be stored as elements of a DID document, which in some cases is only accessible to the trusted third-party 13. Trusted third-party 13 assigns the DID and public key to a party, as described further below with respect to FIG. 9.

The party may further obtain credentials from the trusted third-party, including a verification key and a proving key for a zero-knowledge proof, which are associated by the trusted third-party 13 with the DID and public key assigned to the customer. The proving key may however be discarded by the trusted third-party 13. Trusted third-party 13 may store these credentials to identity store 15. The trusted third-party 13 may assign DIDs to multiple such users of the log verification system provider. Because trusted third-party 13 manages identities for parties, customer data that needs to be logged can be anonymized. For example, cloud service providers or public cloud providers may have customer data that needs to be anonymized and may use (or their end-user customers may use) log verification system 150 to verify the authenticity of log records generated by the customers in some cases.

The party generates log records of transactions between the customer and other parties. Any of the parties can engage in transactions with another party, such as other customers 108 or cloud service providers 110, end-users, and so forth. Transactions may represent not only financial transactions, but any action engaged in by the party that may require attestation, such as specific actions performed by the party, events generated by applications executed by the party, system log transactions, event log transactions, and other types of transactions. In general, end users of an application or service may expect the provider of the application or service to attest to the occurrence of events. For example, users may expect a cloud exchange or network provider to attest to network events or configuration or performance of the cloud exchange or network. External auditors look for addressability. Adding timing information to log records facilitates traceability—for instance, trading platform or stock exchange auditors may seek proof that a specific trade occurred at a specific time. Log verification system 150 may be exposed to such auditors or end users to permit log record verification in these ways.

A computing system associated with the party sends the log records to log verification system 150 along with a zero-knowledge proof generated by the party using the proving key, the DID, and the public key for the party. A zero-knowledge proof is a method by which one party (the prover) can prove to another party (the verifier) that the prover knows a value x without conveying any information apart from the fact that the prover knows the value x. With a zero-knowledge proof, the provider is able to prove knowledge of the value x without revealing the value of x or any additional information, such as information descriptive of x or information about the prover. A zero-knowledge proof satisfies the properties of completeness (if a statement is true (e.g., "I know x."), the proof is sufficient to convince the verifier), soundness (low probability of falsely convincing the verifier if the statement is false), and zero-knowledge (if the statement is true, the verifier learnings nothing other than that the statement is true). An advantage of zero-knowledge proofs, at least in some cases, is the avoidance of computationally-expensive encryption operations. Non-interactive zero-knowledge proof are a variant of zero-knowledge proofs and do not require interaction between the prover and verifier. Zero-knowledge succinct non-interactive argument of knowledge (zk-SNARK) is an example protocol for a non-interactive zero-knowledge proof.

The proof may be generated once by the party or sent by the party to the log verification system 150 with each log record. Log verification system 150 may not store personally-identifying information for the party, such as the DID. Multiple parties may generate log records in this way. Log verification system 150 attaches the corresponding party proofs to the log records and may combine multiple log records and corresponding proofs into a block of log records, which stores multiple such log records and corresponding proof from multiple separate parties. In some cases, log verification system 150 may also append the public key for the party along with each log record. In this way, each proof generated by a party attests to the authenticity of a corresponding log record generated by the party, because only the party having the DID can generate the proof. Log verification system 150 may also time stamp each log record. Log verification system 150 hashes the log block and may submit the log block to be signed by trusted third-party 13. Log verification system 150 stores the log block or signed log block, and the hash, to log store 151. The block may be stored as a block in a chain, such as a block in a Merkle tree.

To verify the authenticity of a log record, log verification system 150 obtains the log block from log store 151 and may submit the log block for signature verification by the trusted third-party 13. Log verification system 150 may send the proof to the trusted third-party for authenticity verification. Using the verification key for the party, which trusted third-party 13 may look up using the proof, along with using the public key for the party and the proof itself, trusted third-party 13 computes the zero-knowledge proof verification algorithm to evaluate whether the proof attests that the party computed the proof using the party DID. Trusted third-party 13 may output an indication of whether the log record is authentic, which computing system 150 may relay to the party or another party seeking to authenticate a transaction or log record.

Cloud exchange 100 includes a programmable network platform 120 for dynamically programming cloud exchange 100 to responsively and assuredly fulfill service requests that encapsulate business requirements for services provided by cloud exchange 100 and/or cloud service providers 110 coupled to the cloud exchange 100. The programmable network platform 120 may, as a result, orchestrate a business-level service across heterogeneous cloud service providers 110 according to well-defined service policies, quality of service policies, service level agreements, and costs, and further according to a service topology for the business-level service.

The programmable network platform 120 enables the cloud service provider that administers the cloud exchange 100 to dynamically configure and manage the cloud exchange 100 to, for instance, facilitate virtual connections for cloud-based services delivery from multiple cloud service providers 110 to one or more cloud customers operating devices 108. The cloud exchange 100 may enable cloud customers to bypass the public Internet to directly connect to cloud services providers 110 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

In other examples, programmable network platform 120 enables the cloud service provider to configure cloud exchange 100 with a L3 instance requested by a cloud customer operating device 108, as described herein. A customer may request an L3 instance to link multiple cloud service providers by the L3 instance, for example (e.g., for transferring the customer's data between two cloud service providers, or for obtaining a mesh of services from multiple cloud service providers).

Programmable network platform 120 may represent an application executing within one or more data centers of the cloud exchange 100 or alternatively, off-site at a back office or branch of a cloud provider (for instance). Programmable network platform 120 may be distributed in whole or in part among the data centers, each data center associated with a different cloud exchange point 128 to make up the cloud exchange 100. Although shown as administering a single cloud exchange 100, programmable network platform 120 may control service provisioning for multiple different cloud exchanges. Alternatively or additionally, multiple separate instances of the programmable network platform 120 may control service provisioning for respective multiple different cloud exchanges.

In the illustrated example, programmable network platform 120 includes a service interface (or "service API") 114 that defines the methods, fields, and/or other software primitives by which applications 130, such as a customer portal, may invoke the programmable network platform 120. The service interface 114 may allow carriers 106, customers, cloud service providers 110, and/or the cloud exchange provider programmable access to capabilities and assets of the cloud exchange 100 according to techniques described herein.

For example, the service interface 114 may facilitate machine-to-machine communication to enable dynamic provisioning of virtual circuits in the cloud exchange for interconnecting customer and/or cloud service provider networks. In this way, the programmable network platform 120 enables the automation of aspects of cloud services provisioning. For example, the service interface 114 may provide an automated and seamless way for customers to establish, de-install and manage interconnections among multiple, different cloud providers participating in the cloud exchange.

In the example of FIG. 1, and in accordance with one or more aspects of the present disclosure, log verification system 150 may provide services to authenticated users of cloud exchange 100. For instance, in the example of FIG. 1, programmable network platform 120 detects input, through service interface 114, that it determines corresponds to authentication credentials from a computing device associated with customer 108A and/or cloud service provider 110A. Programmable network platform 120 may evaluate that the authentication credentials and determines that each of the users associated with the authentication credentials are authorized to access some or all services provided by cloud exchange point 128A, including the log verification service provided by log verification system 150.

Customer 108A may request, using the service interface 114, a virtual circuit with log verification system 150 for private, secure, and low-latency communications. Programmable network platform 120 responsively provisions the virtual circuit. Customer 108A sends a log record 121A and proof in association to log verification system 150 for storage to log store 151, in some cases via the virtual circuit. Cloud service provider 110A may similarly request a virtual circuit with computing system 150. Programmable network platform 120 responsively provisions the virtual circuit. Cloud service provider 110A sends a log record 121B and proof in association to log verification system 150 for storage to log store 151, in some cases via the virtual circuit. Log verification system 150 may store log record 121A and log record 121B in a single block that is digitally-signed by trusted third-party 13.

Programmable network platform 120 may also receive, via the service interface 114, a request for a virtual circuit with a computing system for trusted third-party 13. Programmable network platform 120 responsively provisions the virtual circuit. In this way, log verification system 150 may have a private, secure, low-latency channel with trusted third-party 13 to send log records for authenticity verification and to receive indications of whether such records are authentic.

In some examples, log verification system 150 may enable parties to access an API (e.g., through service interface 114 or directly via a virtual circuit or via the Internet) to, for example, store log records and request verification of the authenticity of a log record. In some examples, log verification system 150 may also enable parties to define usage policies for log record storage and verification.

Further example details of a cloud-based services exchange can be found in U.S. Pat. No. 9,948,552, issued Apr. 17, 2019 and entitled "CLOUD-BASED SERVICES EXCHANGE;" U.S. Pat. No. 9,886,267, issued Feb. 6, 2018 and entitled "INTERCONNECTION PLATFORM FOR REAL-TIME CONFIGURATION AND MANAGEMENT OF A CLOUD-BASED SERVICES EXCHANGE;" and U.S. Pat. No. 10,129,078, issued Nov. 13, 2018 and entitled "ORCHESTRATION ENGINE FOR REAL-TIME CONFIGURATION AND MANAGEMENT OF INTERCONNECTIONS WITHIN A CLOUD-BASED SERVICES EXCHANGE;" each of which are incorporated herein by reference in their respective entireties.

In some cases, log verification system 150 or trusted third-party 13 may use a key service, such as SmartKey, to store and manage credentials or other cryptographic key material. Example description of a key service is found in U.S. patent application Ser. No. 16/006,458, filed Jun. 12, 2018, entitled "Data Center Security Services," which is incorporated by reference herein in its entirety.

Figure 2:
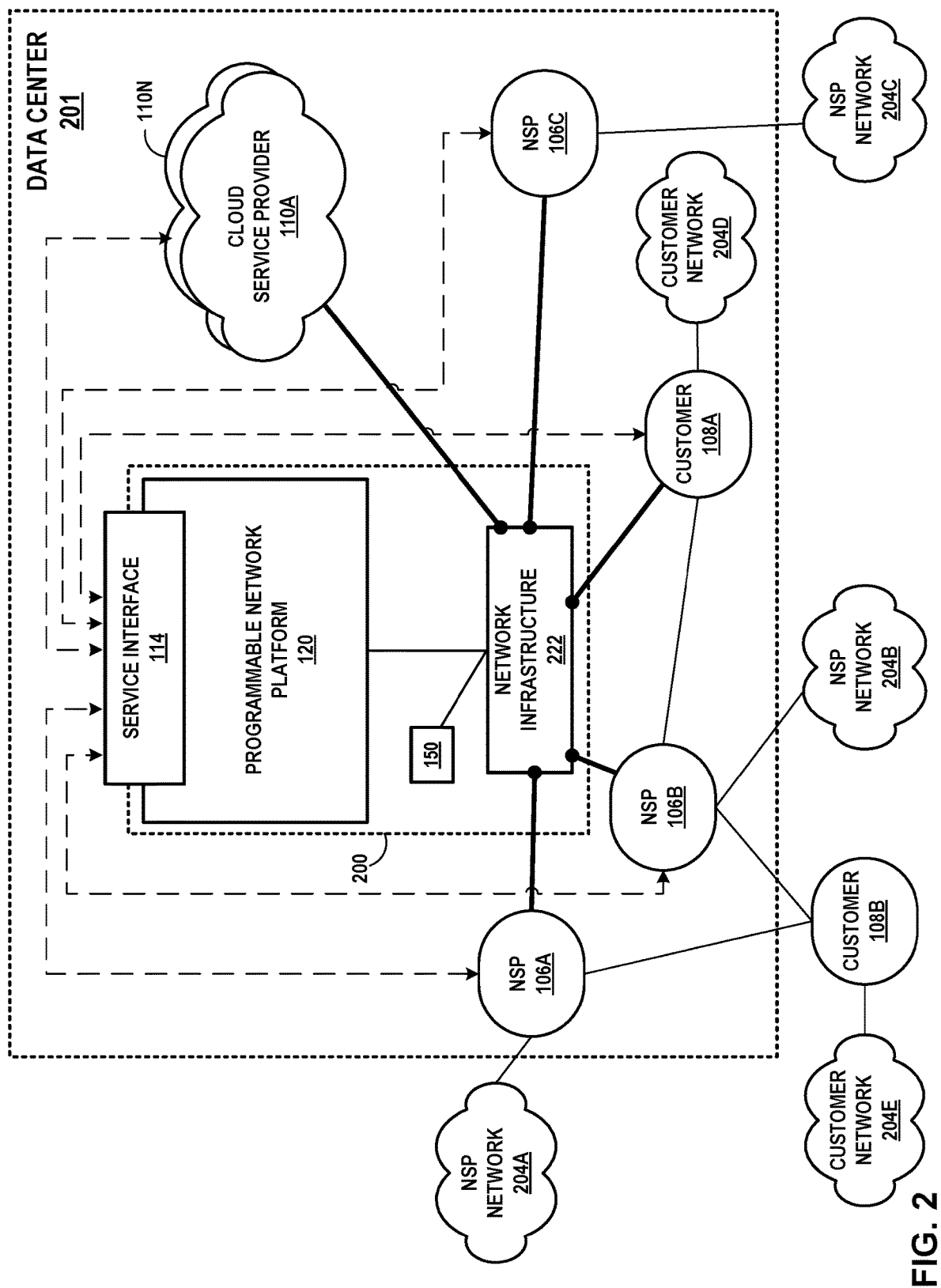
FIG. 2 is a block diagram illustrating a high-level view of a data center that provides an operating environment for a cloud-based services exchange and a log verification system, according to techniques described herein.

FIG. 2 is a block diagram illustrating a high-level view of a data center 201 that provides an operating environment for a cloud-based services exchange 200 and a log verification system 150, according to techniques described herein. Cloud-based services exchange 200 ("cloud exchange 200") allows a corresponding one of customer networks 204D, 204E and NSP networks 204A-204C (collectively, "'private' or 'carrier' networks 204") of any NSPs 106A-106C or other cloud customers including customers 108A, 108B to be directly connected, via a layer 3 (L3) or layer 2 (L2) connection to any other customer network and/or to any of cloud service providers 110A-110N, thereby allowing exchange of cloud service traffic among the customer networks and/or CSPs 110. Data center 201 may be entirely located within a centralized area, such as a warehouse or localized data center complex, and provide power, cabling, security, and other services to NSPs, customers, and cloud service providers that locate their respective networks within the data center 201 (e.g., for co-location) and/or connect to the data center 201 by one or more external links.

Network service providers 106 may each represent a network service provider that is associated with a transit network by which network subscribers of the NSP 106 may access cloud services offered by CSPs 110 via the cloud exchange 200. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 200.

In this way, cloud exchange 200 streamlines and simplifies the process of partnering CSPs 110 and customers 108 (indirectly via NSPs 106 or directly) in a transparent and neutral manner. One example application of cloud exchange 200 is a co-location and interconnection data center in which CSPs 110, NSPs 106 and/or customers 108 may already have network presence, such as by having one or more accessible ports available for interconnection within the data center. This allows the participating carriers, customers, and CSPs to have a wide range of interconnectivity options in the same facility.

Cloud exchange 200 of data center 201 includes network infrastructure 222 that provides a L2/L3 switching fabric by which CSPs 110 and customers/NSPs interconnect. This enables an NSP/customer to have options to create many-to-many interconnections with only a one-time hook up to the switching network and underlying network infrastructure 222 that presents an interconnection platform for cloud exchange 200. In other words, instead of having to establish separate connections across transit networks to access different cloud service providers or different cloud services of one or more cloud service providers, cloud exchange 200 allows customers to interconnect to multiple CSPs and cloud services using network infrastructure 222 within data center 201, which may represent any of the edge networks described in this disclosure, at least in part.

By using cloud exchange 200, customers can purchase services and reach out to many end users in many different geographical areas without incurring the same expenses typically associated with installing and maintaining multiple virtual connections with multiple CSPs 110. For example, NSP 106A can expand its services using network 204B of NSP 106B. By connecting to cloud exchange 200, a NSP 106 may be able to generate additional revenue by offering to sell its network services to the other carriers. For example, NSP 106C can offer the opportunity to use NSP network 204C to the other NSPs.

Cloud exchange 200 includes an programmable network platform 120 that exposes at least one service interface, which may include in some examples and are alternatively referred to herein as application programming interfaces (APIs) in that the APIs define the methods, fields, and/or other software primitives by which applications may invoke the programmable network platform 120. The software interfaces allow NSPs 206 and customers 108 programmable access to capabilities and assets of the cloud exchange 200. The programmable network platform 120 may alternatively be referred to as a controller, provisioning platform, provisioning system, service orchestration system, etc., for establishing end-to-end services including, e.g., connectivity between customers and cloud service providers according to techniques described herein.

On the buyer side, the software interfaces presented by the underlying interconnect platform provide an extensible framework that allows software developers associated with the customers of cloud exchange 200 (e.g., customers 108 and NSPs 206) to create software applications that allow and leverage access to the programmable network platform 120 by which the applications may request that the cloud exchange 200 establish connectivity between the customer and cloud services offered by any of the CSPs 110. For example, these buyer-side software interfaces may allow customer applications for NSPs and enterprise customers, e.g., to obtain authorization to access the cloud exchange, obtain information regarding available cloud services, obtain active ports and metro area details for the customer, create virtual circuits of varying bandwidth to access cloud services, including dynamic selection of bandwidth based on a purchased cloud service to create on-demand and need based virtual circuits to or between cloud service providers, delete virtual circuits, obtain active virtual circuit information, obtain details surrounding CSPs partnered with the cloud exchange provider, obtain customized analytics data, validate partner access to interconnection assets, and assure service delivery.

On the cloud service provider seller side, the software interfaces may allow software developers associated with cloud providers to manage their cloud services and to enable customers to connect to their cloud services. For example, these seller-side software interfaces may allow cloud service provider applications to obtain authorization to access the cloud exchange, obtain information regarding available cloud services, obtain active ports and metro area details for the provider, obtain active port details in a given data center for the provider, approve or reject virtual circuits of varying bandwidth created by customers for the purpose of accessing cloud services, obtain virtual circuits pending addition and confirm addition of virtual circuits, obtain virtual circuits pending deletion and confirm deletion of virtual circuits, obtain customized analytics data, validate partner access to interconnection assets, and assure service delivery.

Service interface 114 facilitates machine-to-machine communication to enable dynamic service provisioning and service delivery assurance. In this way, the programmable network platform 120 enables the automation of aspects of cloud services provisioning. For example, the software interfaces may provide an automated and seamless way for customers to establish, de-install and manage interconnection with or between multiple, different cloud providers participating in the cloud exchange. The programmable network platform 120 may in various examples execute on one or virtual machines and/or real servers of data center 201, or off-site.

In the example of FIG. 2, network infrastructure 222 represents the cloud exchange switching fabric and includes multiple ports that may be dynamically interconnected with virtual circuits by, e.g., invoking service interface 114 of the programmable network platform 120. Each of the ports is associated with one of carriers 106, customers 108, and CSPs 110.

In some examples, a cloud exchange seller (e.g., an enterprise or a CSP nested in a CSP) may request and obtain an L3 instance, and may then create a seller profile associated with the L3 instance, and subsequently operate as a seller on the cloud exchange. The techniques of this disclosure enable multiple CSPs to participate in an Enterprise's L3 instance (e.g., an L3 "routed instance" or L2 "bridged instance") without each CSP flow being anchored with an enterprise device.

In some aspects, the programmable network platform may provision a cloud exchange to deliver services made up of multiple constituent services provided by multiple different cloud service providers, where this is provided via the L3 instance as a service described herein. Each of these constituent services is referred to herein as a "micro-service" in that it is part of an overall service applied to service traffic. That is, a plurality of micro-services may be applied to service traffic in a particular "arrangement," "ordering," or "topology," in order to make up an overall service for the service traffic. The micro-services themselves may be applied or offered by the cloud service providers 110.

Example cloud exchange 200 includes an instance of log verification system 150.

Figure 3A:
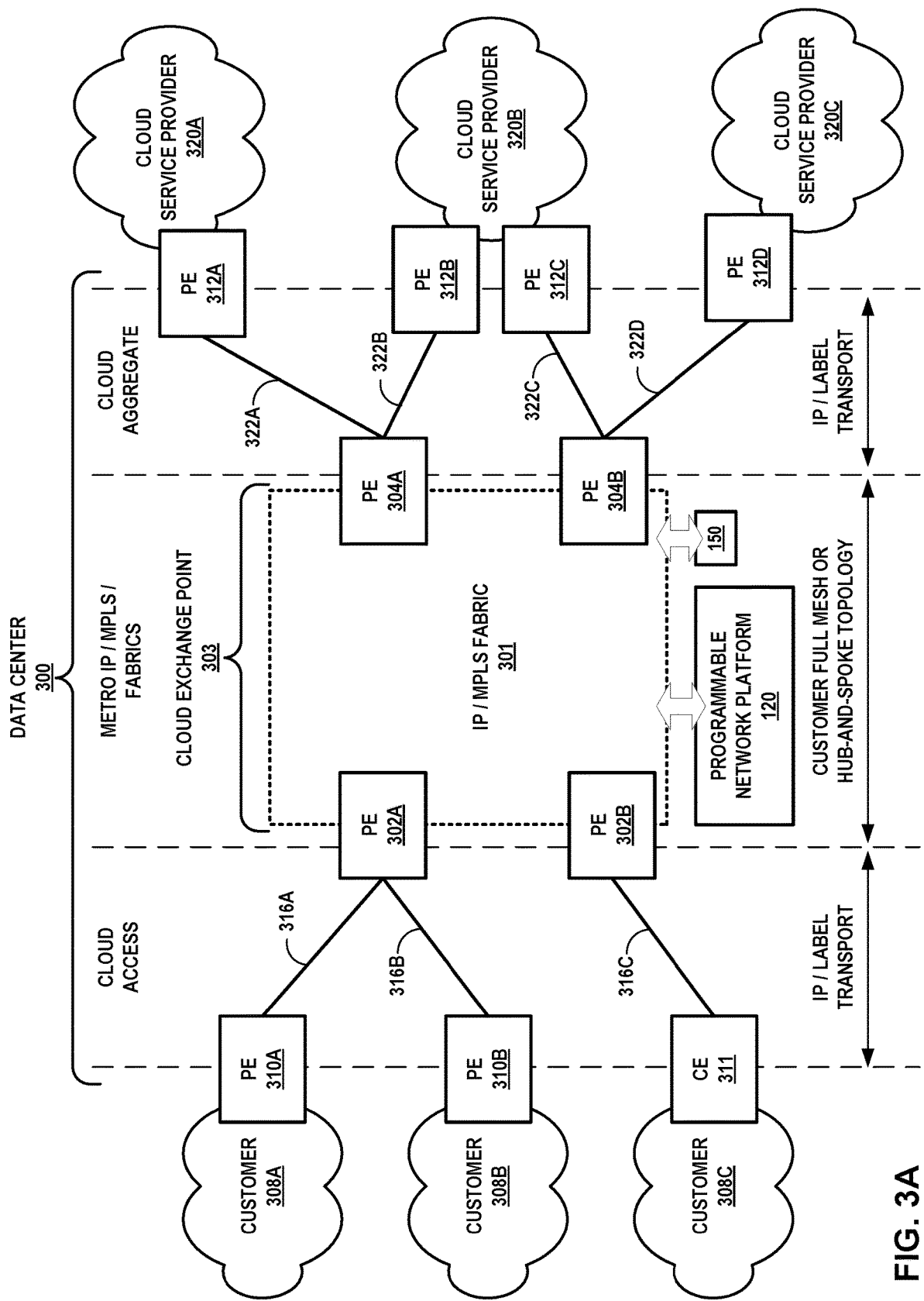
FIG. 3A and FIG. 3B are block diagrams illustrating example network infrastructure and service provisioning by a programmable network platform for a cloud exchange that aggregates the cloud services of multiple cloud service providers for provisioning to customers of the cloud exchange provider and aggregates access for multiple customers to one or more cloud service providers, in part to access a log verification system, in accordance with techniques described in this disclosure.
Figure 3B:
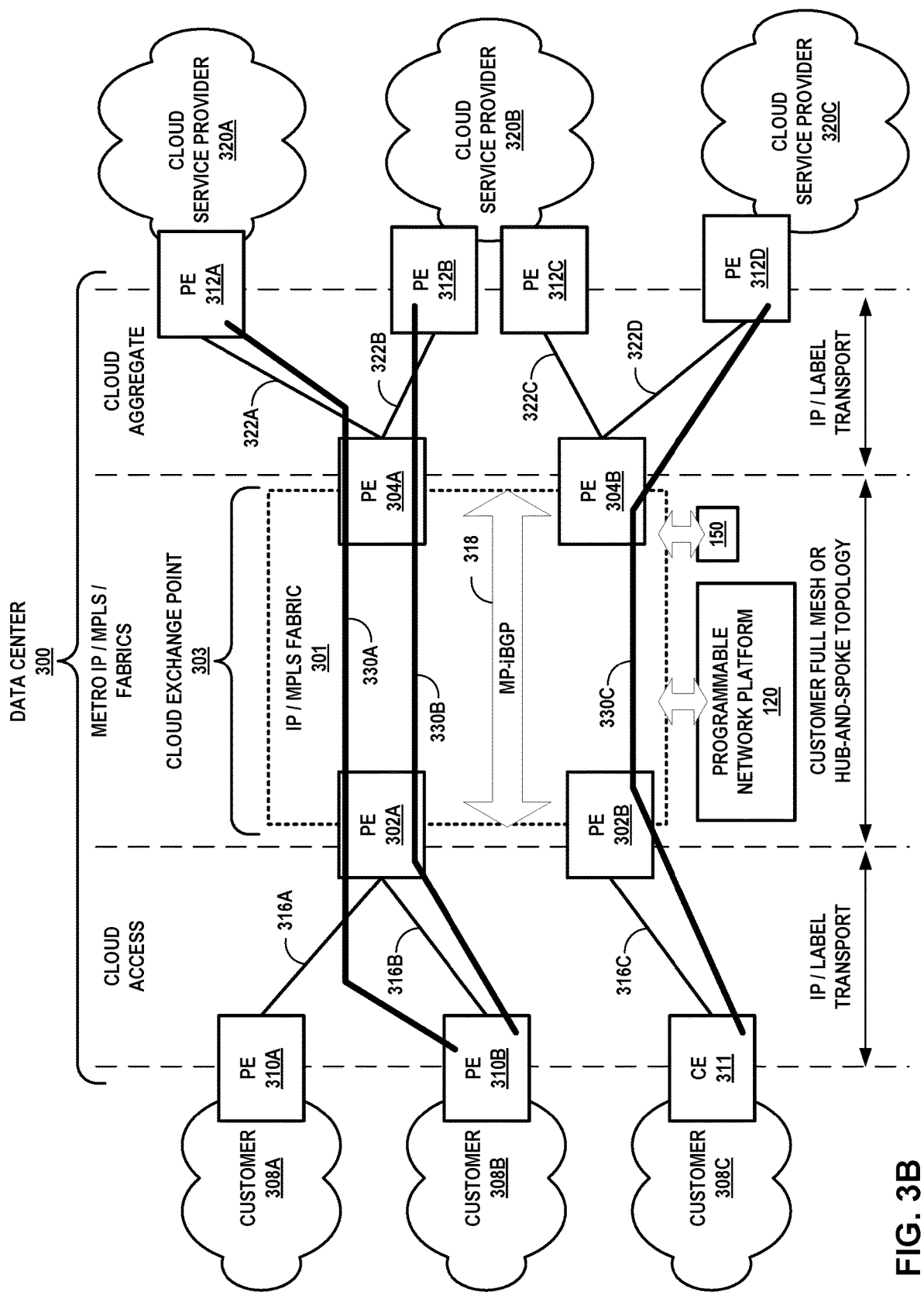

FIG. 3A and FIG. 3B are block diagrams illustrating example network infrastructure and service provisioning by a programmable network platform for a cloud exchange that aggregates the cloud services of multiple cloud service providers for provisioning to customers of the cloud exchange provider and aggregates access for multiple customers to one or more cloud service providers, in part to access a log verification system, in accordance with techniques described in this disclosure. In this example, customer networks 308A-308C (collectively, "customer networks 308"), each associated with a different customer, access a cloud exchange point within a data center 300 in order receive aggregated cloud services from one or more cloud service provider networks 320, each associated with a different cloud service provider 110. In some examples, customer networks 308 each include endpoint devices that consume cloud services provided by cloud service provider network 320. Example endpoint devices include servers, smart phones, television set-top boxes, workstations, laptop/tablet computers, video gaming systems, teleconferencing systems, media players, and so forth.

Customer networks 308A-308B include respective provider edge/autonomous system border routers (PE/ASBRs) 310A-310B. Each of PE/ASBRs 310A, 310B may execute exterior gateway routing protocols to peer with one of PE routers 302A-302B ("PE routers 302" or more simply "PEs 302") over one of access links 316A-316B (collectively, "access links 316"). In the illustrated examples, each of access links 316 represents a transit link between an edge router of a customer network 308 and an edge router (or autonomous system border router) of cloud exchange point 303. For example, PE 310A and PE 302A may directly peer via an exterior gateway protocol, e.g., exterior BGP, to exchange L3 routes over access link 316A and to exchange L3 data traffic between customer network 308A and cloud service provider networks 320. Access links 316 may in some cases represent and alternatively be referred to as attachment circuits for IP-VPNs configured in IP/MPLS fabric 301, as described in further detail below. Access links 316 may in some cases each include a direct physical connection between at least one port of a customer network 308 and at least one port of cloud exchange point 303, with no intervening transit network. Access links 316 may operate over a VLAN or a stacked VLAN (e.g, QinQ), a VxLAN, an LSP, a GRE tunnel, or other type of tunnel.

While illustrated and primarily described with respect to L3 connectivity, PE routers 302 may additionally offer, via access links 316, L2 connectivity between customer networks 308 and cloud service provider networks 320. For example, a port of PE router 302A may be configured with an L2 interface that provides, to customer network 308A, L2 connectivity to cloud service provider 320A via access link 316A, with the cloud service provider 320A router 312A coupled to a port of PE router 304A that is also configured with an L2 interface. The port of PE router 302A may be additionally configured with an L3 interface that provides, to customer network 308A, L3 connectivity to cloud service provider 320B via access links 316A. PE 302A may be configured with multiple L2 and/or L3 sub-interfaces such that customer 308A may be provided, by the cloud exchange provider, with a one-to-many connection to multiple cloud service providers 320.

To create an L2 interconnection between a customer network 308 and a cloud service provider network 320, in some examples, IP/MPLS fabric 301 is configured with an L2 bridge domain (e.g., an L2 virtual private network (L2VPN) such as a virtual private LAN service (VPLS), E-LINE, or E-LAN) to bridge L2 traffic between a customer-facing port of PEs 302 and a CSP-facing port of cloud service providers 320. In some cases, a cloud service provider 320 and customer 308 may have access links to the same PE router 302, 304, which bridges the L2 traffic using the bridge domain.

Example cloud exchange point 303 includes an instance of log verification system 150. As described above with respect to FIG. 1, programmable network platform 120 may establish virtual circuits to create a secure, private connection between any one or more of the parties 308, 320 and log verification system 150.

To create an L3 interconnection between a customer network 308 and a cloud service provider network 320, in some examples, IP/MPLS fabric 301 is configured with L3 virtual routing and forwarding instances (VRFs), as described in further detail below with respect to FIG. 4. In some cases, IP/MPLS fabric 301 may be configured with an L3 instance that includes one or more VRFs, and the L3 instance may link multiple cloud service provider networks 320. In this case, a customer network 308 might not need to be interconnected or have any physical presence in the cloud exchange or data center.

Each of access links 316 and aggregation links 322 may include a network interface device (NID) that connects customer network 308 or cloud service provider 328 to a network link between the NID and one of PE routers 302, 304. Each of access links 316 and aggregation links 322 may represent or include any of a number of different types of links that provide L2 and/or L3 connectivity.

In this example, customer network 308C is not an autonomous system having an autonomous system number. Customer network 308C may represent an enterprise, network service provider, or other customer network that is within the routing footprint of the cloud exchange point. Customer network includes a customer edge (CE) device 311 that may execute exterior gateway routing protocols to peer with PE router 302B over access link 316C. In various examples, any of PEs 310A-310B may alternatively be or otherwise represent CE devices.

Access links 316 include physical links. PE/ASBRs 310A-310B, CE device 311, and PE routers 302A-302B exchange L2/L3 packets via access links 316. In this respect, access links 316 constitute transport links for cloud access via cloud exchange point 303. Cloud exchange point 303 may represent an example of any of cloud exchange points 128. Data center 300 may represent an example of data center 201.

Cloud exchange point 303, in some examples, aggregates customers 308 access to the cloud exchange point 303 and thence to any one or more cloud service providers 320. FIG. 3A and FIG. 3B, e.g., illustrate access links 316A-316B connecting respective customer networks 308A-308B to PE router 302A of cloud exchange point 303 and access link 316C connecting customer network 308C to PE router 302B. Any one or more of PE routers 302, 304 may comprise ASBRs. PE routers 302, 304 and IP/MPLS fabric 301 may be configured according to techniques described herein to interconnect any of access links 316 to any of cloud aggregation links 322. As a result, cloud service provider network 320A, e.g., needs only to have configured a single cloud aggregate link (here, access link 322A) in order to provide services to multiple customer networks 308. That is, the cloud service provider operating cloud service provider network 320A does not need to provision and configure separate service links from cloud service provider network 320A to each of PE routers 310, 311, for instance, in order to provide services to each of customer network 308. Cloud exchange point 303 may instead connect cloud aggregation link 322A and PE 312A of cloud service provider network 320A to multiple cloud access links 316 to provide layer 3 peering and network reachability for the cloud services delivery.

In addition, a single customer network, e.g., customer network 308A, need only to have configured a single cloud access link (here, access link 316A) to the cloud exchange point 303 within data center 300 in order to obtain services from multiple cloud service provider networks 320 offering cloud services via the cloud exchange point 303. That is, the customer or network service provider operating customer network 308A does not need to provision and configure separate service links connecting customer network 308A to different PE routers 312, for instance, in order to obtain services from multiple cloud service provider networks 320. Cloud exchange point 303 may instead connect cloud access link 316A (again, as one example) to multiple cloud aggregate links 322 to provide layer 3 peering and network reachability for the cloud services delivery to customer network 308A.

Cloud service provider networks 320 each includes servers configured to provide one or more cloud services to users. These services may be categorized according to service types, which may include for examples, applications/software, platforms, infrastructure, virtualization, and servers and data storage. Example cloud services may include content/media delivery, cloud-based storage, cloud computing, online gaming, IT services, etc.

Cloud service provider networks 320 include PE routers 312A-312D that each executes an exterior gateway routing protocol, e.g., eBGP, to exchange routes with PE routers 304A-304B (collectively, "PE routers 304") of cloud exchange point 303. Each of cloud service provider networks 320 may represent a public, private, or hybrid cloud. Each of cloud service provider networks 320 may have an assigned autonomous system number or be part of the autonomous system footprint of cloud exchange point 303.

In the illustrated example, an Internet Protocol/Multiprotocol label switching (IP/MPLS) fabric 301 interconnects PEs 302 and PEs 304. IP/MPLS fabric 301 include one or more switching and routing devices, including PEs 302, 304, that provide IP/MPLS switching and routing of IP packets to form an IP backbone. In some example, IP/MPLS fabric 301 may implement one or more different tunneling protocols (i.e., other than MPLS) to route traffic among PE routers and/or associate the traffic with different IP-VPNs. In accordance with techniques described herein, IP/MPLS fabric 301 implement IP virtual private networks (IP-VPNs) to connect any of customers 308 with multiple cloud service provider networks 320 to provide a data center-based 'transport' and layer 3 connection.

Whereas service provider-based IP backbone networks require wide-area network (WAN) connections with limited bandwidth to transport service traffic from layer 3 services providers to customers, the cloud exchange point 303 as described herein 'transports' service traffic and connects cloud service providers 320 to customers 308 within the high-bandwidth local environment of data center 300 provided by a data center-based IP/MPLS fabric 301. In some examples, IP/MPLS fabric 301 implements IP-VPNs using techniques described in Rosen & Rekhter, "BGP/MPLS IP Virtual Private Networks (VPNs)," Request for Comments 4364, February 2006, Internet Engineering Task Force (IETF) Network Working Group, the entire contents of which is incorporated by reference herein. In some example configurations, a customer network 308 and cloud service provider network 320 may connect via respective links to the same PE router of IP/MPLS fabric 301.

Access links 316 and aggregation links 322 may include attachment circuits that associate traffic, exchanged with the connected customer network 308 or cloud service provider network 320, with virtual routing and forwarding instances (VRFs) configured in PEs 302, 304 and corresponding to IP-VPNs operating over IP/MPLS fabric 301. For example, PE 302A may exchange IP packets with PE 310A on a bidirectional label-switched path (LSP) operating over access link 316A, the LSP being an attachment circuit for a VRF configured in PE 302A. As another example, PE 304A may exchange IP packets with PE 312A on a bidirectional label-switched path (LSP) operating over access link 322A, the LSP being an attachment circuit for a VRF configured in PE 304A. Each VRF may include or represent a different routing and forwarding table with distinct routes.

PE routers 302, 304 of IP/MPLS fabric 301 may be configured in respective hub-and-spoke arrangements for cloud services, with PEs 304 implementing cloud service hubs and PEs 302 being configured as spokes of the hubs (for various hub-and-spoke instances/arrangements). A hub-and-spoke arrangement ensures that service traffic is enabled to flow between a hub PE and any of the spoke PEs, but not directly between different spoke PEs. As described further below, in a hub-and-spoke arrangement for data center-based IP/MPLS fabric 301 and for southbound service traffic (i.e., from a CSP to a customer) PEs 302 advertise routes, received from PEs 310, to PEs 304, which advertise the routes to PEs 312. For northbound service traffic (i.e., from a customer to a CSP), PEs 304 advertise routes, received from PEs 312, to PEs 302, which advertise the routes to PEs 310.

For some customers of cloud exchange point 303, the cloud exchange point 303 provider may configure a full mesh arrangement whereby a set of PEs 302, 304 each couple to a different customer site network for the customer. In such cases, the IP/MPLS fabric 301 implements a layer 3 VPN (L3VPN) for cage-to-cage or redundancy traffic (also known as east-west or horizontal traffic). The L3VPN may effectuate a closed user group whereby each customer site network can send traffic to one another but cannot send or receive traffic outside of the L3VPN.

PE routers may couple to one another according to a peer model without use of overlay networks. That is, PEs 310 and PEs 312 might not peer directly with one another to exchange routes, but rather indirectly exchange routes via IP/MPLS fabric 301. In the example of FIG. 3B, cloud exchange point 303 is configured to implement multiple layer 3 virtual circuits 330A-330C (collectively, "virtual circuits 330") to interconnect customer network 308 and cloud service provider networks 322 with end-to-end IP paths. Each of cloud service providers 320 and customers 308 may be an endpoint for multiple virtual circuits 330, with multiple virtual circuits 330 traversing one or more attachment circuits between a PE/PE or PE/CE pair for the IP/MPLS fabric 301 and the CSP/customer. A virtual circuit 330 represents a layer 3 path through IP/MPLS fabric 301 between an attachment circuit connecting a customer network to the fabric 301 and an attachment circuit connecting a cloud service provider network to the fabric 301. Each virtual circuit 330 may include at least one tunnel (e.g., an LSP and/or Generic Route Encapsulation (GRE) tunnel) having endpoints at PEs 302, 304. PEs 302, 304 may establish a full mesh of tunnels interconnecting one another.

Each virtual circuit 330 may include a different hub-and-spoke network configured in IP/MPLS network 301 having PE routers 302, 304 exchanging routes using a full or partial mesh of border gateway protocol peering sessions, in this example a full mesh of Multiprotocol Interior Border Gateway Protocol (MP-iBGP) peering sessions. MP-iBGP or simply MP-BGP is an example of a protocol by which routers exchange labeled routes to implement MPLS-based VPNs. However, PEs 302, 304 may exchange routes to implement IP-VPNs using other techniques and/or protocols.

In the example of virtual circuit 330A, PE router 312A of cloud service provider network 320A may send a route for cloud service provider network 320A to PE 304A via a routing protocol (e.g., eBGP) peering connection with PE 304A. PE 304A associates the route with a hub-and-spoke network, which may have an associated VRF, that includes spoke PE router 302A. PE 304A then exports the route to PE router 302A; PE router 304A may export the route specifying PE router 304A as the next hop router, along with a label identifying the hub-and-spoke network. PE router 302A sends the route to PE router 310B via a routing protocol connection with PE 310B. PE router 302A may send the route after adding an autonomous system number of the cloud exchange point 303 (e.g., to a BGP autonomous system path (AS_PATH) attribute) and specifying PE router 302A as the next hop router. Cloud exchange point 303 is thus an autonomous system "hop" in the path of the autonomous systems from customers 308 to cloud service providers 320 (and vice-versa), even though the cloud exchange point 303 may be based within a data center. PE router 310B installs the route to a routing database, such as a BGP routing information base (RIB) to provide layer 3 reachability to cloud service provider network 320A. In this way, cloud exchange point 303 "leaks" routes from cloud service provider networks 320 to customer networks 308, without cloud service provider networks 320 to customer networks 308 requiring a direct layer peering connection.

PE routers 310B, 302A, 304A, and 312A may perform a similar operation in the reverse direction to forward routes originated by customer network 308B to PE 312A and thus provide connectivity from cloud service provider network 320A to customer network 308B. In the example of virtual circuit 330B, PE routers 312B, 304A, 302A, and 310B exchange routes for customer network 308B and cloud service provider 320B in a manner similar to that described above for establishing virtual circuit 330B. As a result, cloud exchange point 303 within data center 300 internalizes the peering connections that would otherwise be established between PE 310B and each of PEs 312A, 312B so as to perform cloud aggregation for multiple layer 3 cloud services provided by different cloud service provider networks 320A, 320B and deliver the multiple, aggregated layer 3 cloud services to a customer network 308B having a single access link 316B to the cloud exchange point 303.

Absent the techniques described herein, fully interconnecting customer networks 308 and cloud service provider networks 320 would require 3×3 peering connections between each of PEs 310 and at least one of PEs 312 for each of cloud service provider networks 320. For instance, PE 310A would require a layer 3 peering connection with each of PEs 312. With the techniques described herein, cloud exchange point 303 may fully interconnect customer networks 308 and cloud service provider networks 320 with one peering connection per site PE (i.e., for each of PEs 310 and PEs 312) by internalizing the layer 3 peering and providing data center-based 'transport' between cloud access and cloud aggregate interfaces.

In examples in which IP/MPLS fabric 301 implements BGP/MPLS IP-VPNs or other IP-VPNs that use route targets to control route distribution within the IP backbone, PEs 304 may be configured to import routes from PEs 302 and to export routes received from PEs 312, using different asymmetric route targets. Likewise, PEs 302 may be configured to import routes from PEs 304 and to export routes received from PEs 310 using the asymmetric route targets. Thus, PEs 302, 304 may configured to implement advanced L3VPNs that each includes a basic backbone L3 VPN of IP/MPLS fabric 301 together with extranets of any of customer networks 308 and any of cloud service provider networks 320 attached to the basic backbone L3VPN.

Each advanced L3VPN constitutes a cloud service delivery network from a cloud service provider network 320 to one or more customer networks 308, and vice-versa. In this way, cloud exchange point 303 enables any cloud service provider network 320 to exchange cloud service traffic with any customer network 308 while internalizing the layer 3 routing protocol peering connections that would otherwise be established between pairs of customer networks 308 and cloud service provider networks 320 for any cloud service connection between a given pair. In other words, the cloud exchange point 303 allows each of customer networks 308 and cloud service provider networks 320 to establish a single (or more for redundancy or other reasons) layer 3 routing protocol peering connection to the data center-based layer 3 connect. By filtering routes from cloud service provider networks 320 to customer networks 308, and vice-versa, PEs 302, 304 thereby control the establishment of virtual circuits 330 and the flow of associated cloud service traffic between customer networks 308 and cloud service provider networks 320 within a data center 300. Routes distributed into MP-iBGP mesh 318 may be VPN-IPv4 routes and be associated with route distinguishers to distinguish routes from different sites having overlapping address spaces.

Programmable network platform 120 may receive service requests for creating, reading, updating, and/or deleting end-to-end services of the cloud exchange point 303. In response, programmable network platform 120 may configure PEs 302, 304 and/or other network infrastructure of IP/MPLS fabric 301 to provision or obtain performance or other operations information regarding the service. Operations for provisioning a service and performed by programmable network platform 120 may include configuring or updating VRFs, installing SDN forwarding information, configuring LSPs or other tunnels, configuring BGP, configuring access links 316 and aggregation links 322, or otherwise modifying the configuration of the IP/MPLS fabric 301. Other operations may include making service requests to an orchestration system for cloud service provider networks 320, as described in further detail below.

Figure 4:
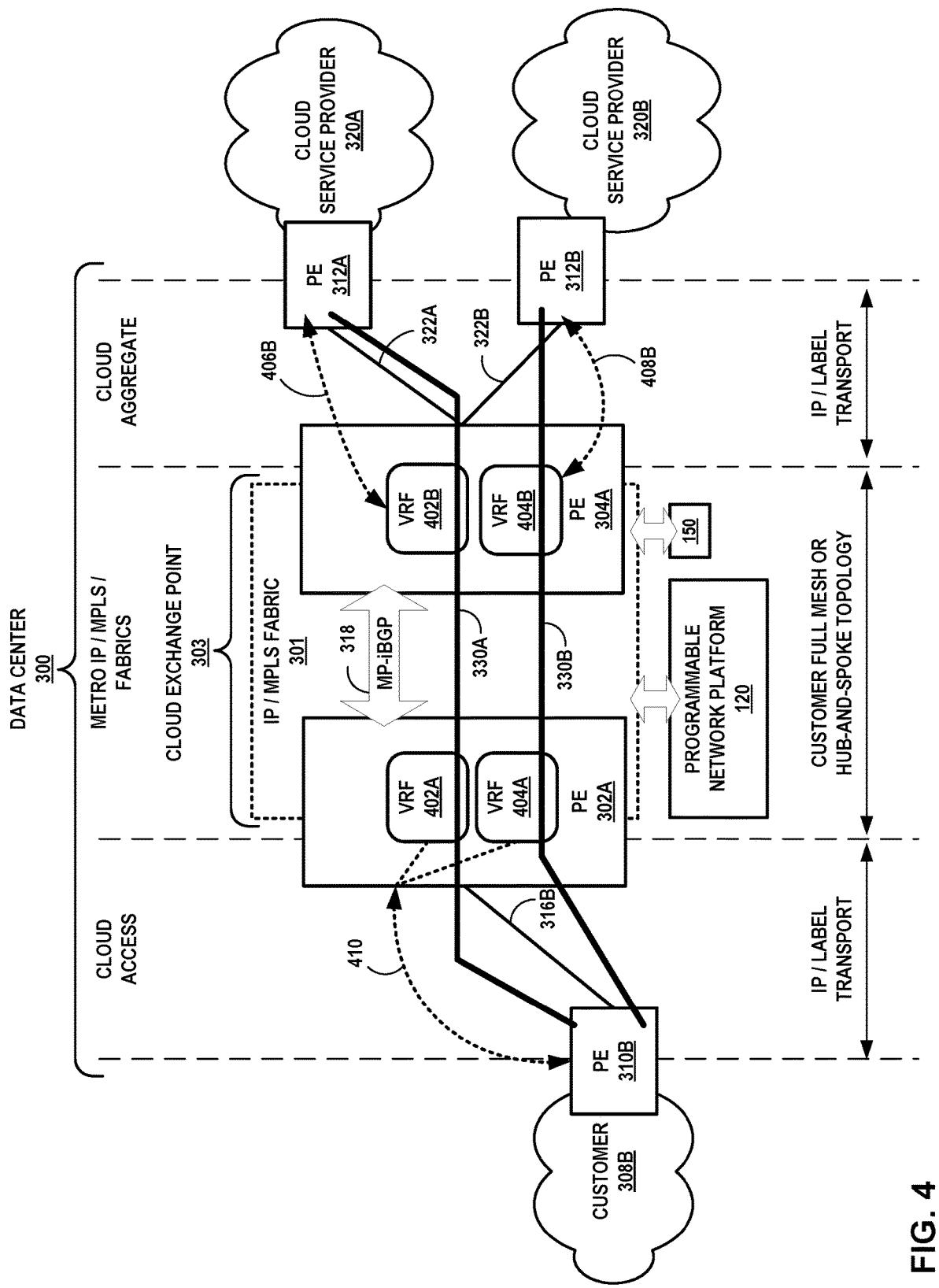
FIG. 4 is a block diagram illustrating an example of a data center-based cloud exchange point in which routers of the cloud exchange point are configured by programmable network platform with VPN routing and forwarding instances for routing and forwarding aggregated service traffic from multiple cloud service provider networks to a customer network, in part for accessing a log verification system, according to techniques described herein.

FIG. 4 is a block diagram illustrating an example of a data center-based cloud exchange point in which routers of the cloud exchange point are configured by programmable network platform 120 with VPN routing and forwarding instances for routing and forwarding aggregated service traffic from multiple cloud service provider networks to a customer network, in part for accessing a log verification system, according to techniques described herein. In this example, to establish virtual circuits 330A-330B, PE routers 302A and 304A of IP/MPLS fabric 301 are configured with VRFs. PE 302A is configured with VRFs 402A and 404A, while PE 304A is configured with VRFs 402B and 404B. VRF 402A is configured to import routes exported by VRF 402B, and VRF 402B is configured to import routes exported by VRF 402A. The configuration may include asymmetric route targets for import/export between VRFs 402A, 402B. VRF 404A is configured to import routes exported by VRF 402B, and VRF 402B is configured to import routes exported by VRF 402A. The configuration may include asymmetric route targets for import/export between VRFs 402A, 402B. This configuration whereby a customer can access multiple layer 3 services from different CSPs each associated with separate VRFs to access the layer 3 services provides isolation of respective traffic exchanged with the CSPs. In some examples, PE 302A may be configured with a single VRF to import routes exported by both VRF 402B and VRF 404B. As noted above with respect to FIG. 3A and FIG. 3B, PEs 302, 304 may be further configured to bridge layer 2 traffic between customer 308B and cloud service providers 320.

In this example, PE 304A operates BGP or other route distribution protocol peering connections 406B, 408B with respective PEs 312A, 312B to exchange routes with respective cloud service provider networks 320A, 320B. PE 302A operates a BGP or other route distribution protocol peering connection 410 with PE 310B to exchange routes with customer network 308B. In some examples, PEs 302A, 304A may be statically configured with routes for the site networks.

An administrator or a programmable network platform described herein for cloud exchange point 303 may configure PEs 302A, 304A with the VRF 402A-402B, 404A-404B in order to leak routes between PEs 312 and PE 310B and facilitate layer 3 connectivity for end-to-end IP paths illustrated here by virtual circuits 330, while potentially optimizing the end-to-end IP paths by fostering data center-based or at least metro-based connectivity. Cloud exchange point 303 may thus provide dedicated cloud service provider access to customer network 308B by way of private and/or public routes for the cloud service provider networks 320. In the northbound direction, cloud exchange point 303 may provide dedicated cloud service provider distribution to multiple customer networks 308 by way of private and/or public routes for the customer networks 308. Neither PE 310B nor any of PEs 302A, 304A need access to the full Internet BGP routing table to reach cloud service provider networks 320 or customer networks 308. Moreover, PEs 302A, 304A may be configured to aggregate customer/CSP routes and/or service traffic based on any one or more of physical, IP, service, and VRFs.

Figure 5:
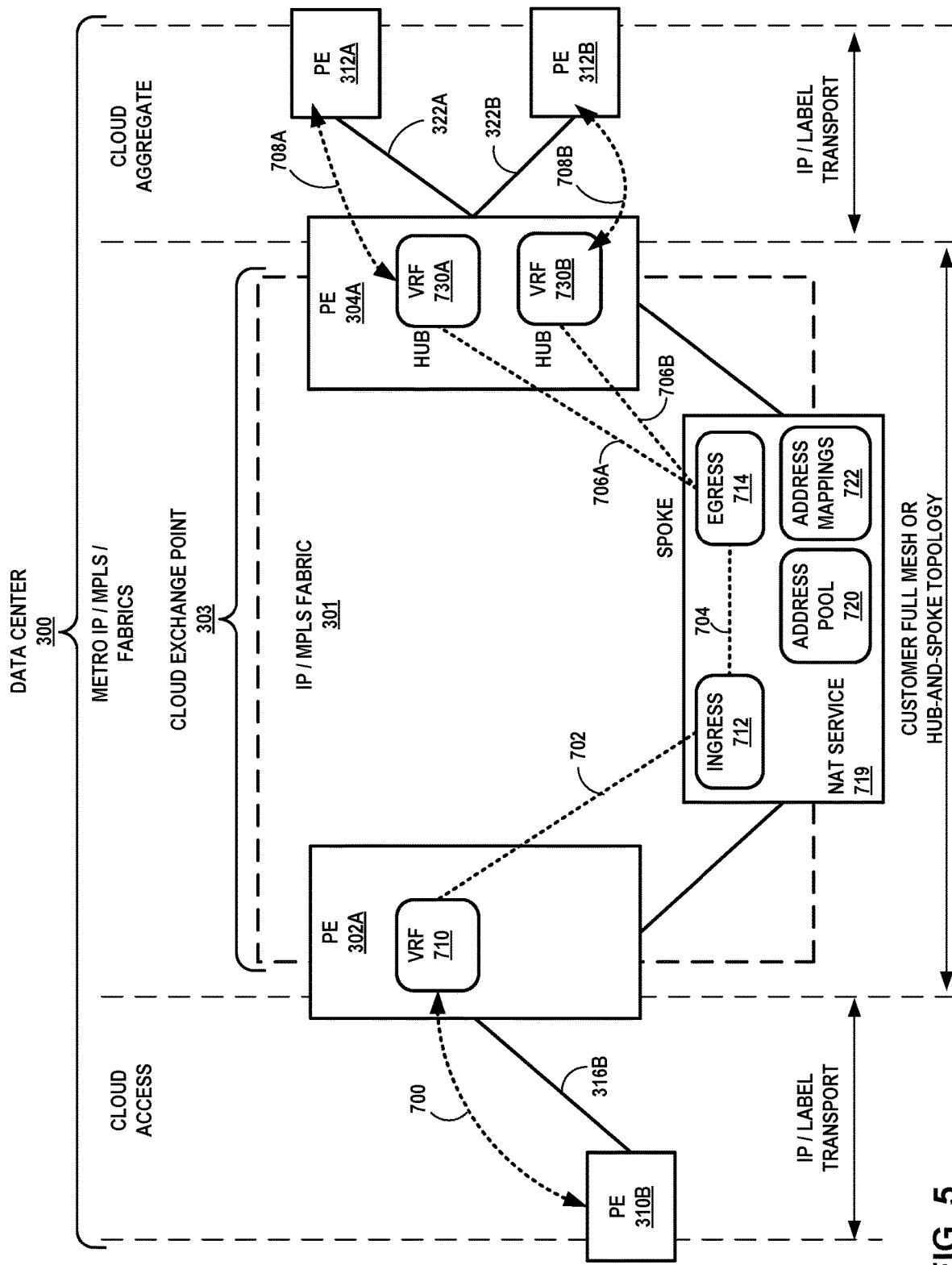
FIG. 5 is a block diagram illustrating an example of a data center-based cloud exchange point, according to techniques described herein.

FIG. 5 is a block diagram illustrating an example of a data center-based cloud exchange point, according to techniques described herein. Cloud service provider networks 320 and customer networks 308 are not shown in FIG. 5 for ease of illustration purposes. In these examples, the data center-based cloud exchange point 303 applies a network address translation (NAT) service 719 to, in part, enforce network address separation between the cloud service layer accessible via cloud aggregation links 322 and the cloud access layer accessible via cloud access links 316.

A cloud exchange point 303 NAT device(s) that applies NAT service 719 performs NAT (or NAPT), which may also or alternatively include carrier-grade NAT ("CG-NAT" or "CGN"), to translate the cloud exchange point 303 addresses and CSP routes and/or to translate the cloud exchange point 303 addresses and customer routes. The cloud exchange point 303 NAT device(s) that applies NAT service 719 (also referred to herein as "NAT service 719 device") may include one or more dedicated NAT appliances, one or more virtual machines executing on real server(s) and configured to apply NAT using network function virtualization (NFV), one or more service cards configured to apply the NAT service 719 and inserted in one or more of PEs 302, 304, or other device(s) inbox or out-of-box.

NAT service 719 of FIG. 5 may be implemented in one or more NAT service devices. In FIG. 5, the NAT service 719 is associated with an address pool 720 that is configured with routes for the cloud exchange point 303 autonomous system and from which the NAT service 719 may draw to automatically provision and map, for NAT purposes, to customer and/or cloud service provider routes received via peering sessions 700 and 708A-708B, respectively. The network addresses for configured routes in address pool 720 (or "NAT pool 720") may be public, private, or a combination thereof, and may represent IPv4 and/or IPv6 routes. In some examples, the network addresses are public in order to provide global uniqueness for the network addresses.

Address mappings 722 may specify one or more NAT mappings and/or network address and port translations (NAPT) that associate routes from address pool 720 for the cloud exchange point 303 with routes received by the cloud exchange point 303 routers from any of PEs 310, 312. Routes received from any of PEs 310, 312 for translation and used in end-to-end service delivery may include any IP addresses/prefixes from enterprise/NSP customers of the cloud exchange provider, such addresses including private and/or public IPv4 and/or IPv6 addresses and received at any one or more of the cloud exchange points managed by the cloud exchange provider.

As noted above, NAT service 719 may perform NAT to translate customer routes for customer network 308B (not shown in FIG. 5) and cloud exchange point 303 routes advertised to PEs 312A, 312B for aggregated cloud access. As a result, CSP networks 320 (not shown in FIG. 5) receive the cloud exchange point 303 routes drawn from address pool 720 instead of the customer routes. The cloud exchange point 303 is thus able to filter customer network information from the CSPs, and the CSPs receive cloud exchange point 303 routes associated with a single autonomous system (i.e., the cloud exchange point 303 and one ASN per cloud exchange point) rather than customer routes (which could potentially number in the millions) associated with multiple different autonomous systems (and corresponding ASNs, which could potentially number in the hundreds) for various customers (enterprises and/or NSPs).

Further, because the cloud exchange point 303 does not advertise its routes other than to customers and CSPs, the cloud exchange point 303 does not announce its routes to the Internet, which may improve security and reduce the potential for Denial of Service (DoS) or other malicious activity directed to the cloud exchange point 303 and customers/CSPs with which the cloud exchange point 303 has peering relationships. In addition, the techniques described above may simplify end-to-end cloud service delivery processing and improve performance by ensuring that local traffic is processed locally (within the cloud exchange point 303).

In the illustrated example, NAT service 719 is associated with ingress service VRF 712 ("ingress 712") and egress service VRF 714 ("egress 714") for attracting service traffic that is associated with customer network 308B and that is to be NATted. Ingress 712 and egress 714 constitute part of a customer service chain for cloud service traffic between customer network 308B and CSP networks 320A, 320B. Customer VRF 710 associated customer network 308B receives routes from customer PE 310B via peering session 700. Customer VRF 710 may be configured in a VPN-full mesh relationship with ingress service VRFs distributed in the cloud exchange point 303 (only one peering session 702 is illustrated, however).

In some examples, PE 302A distributes, for VRF 710, customer routes received via peering session 700 to the NAT service 719, which dynamically maps the customer route prefixes to cloud exchange point route prefixes drawn from address pool 720. The customer routes are installed to ingress service VRF 712. The NAT service 719 installs the mappings to address mappings 722 and installs, to egress service VRF 714, cloud exchange point routes that specify the cloud exchange point route prefixes and NAT service 719 as the next hop. In this way, NAT service 719 and more specifically egress service VRF 714 attracts downstream traffic from CSP network 320 that is intended for the customer network 308B but destined for the cloud exchange point routes installed to egress service VRF 714. Ingress service VRF 712 and egress service VRF 714 may establish peering session 704 and be configured with route targets to cause VRFs 712, 714 to leak routes to one another via iBGP, for instance.

Egress service VRF 714 may operate as a spoke VRF for corresponding hub VRFRs 730A, 730B in a manner similar to VRFs of PE 302A operating as spoke VRFs in the example of FIG. 4. That is, egress service VRF 714 and VRFs 730A, 730B are configured with reciprocal route targets such that egress service VRF 714 advertises routes for the egress service VRF 714 for installation to VRFs 730A, 730B, while VRFs 730A, 730B advertise routes for corresponding CSP networks 320A, 320B to egress service VRF 714. NATted upstream service traffic destined to any of CSP networks 320A, 320B passes through corresponding hub VRFs 730A, 730B. Each of peering sessions 706A, 706B may be used in this way to create hub-and-spoke VPNs for the respective CSP networks 320A, 320B.

PEs 302, 304 may establish tunnels with the NAT service 719 device. Routes exchanged via peering sessions 702 and 706A, 706B may include labeled routes for implementing MPLS/BGP IP-VPNs according to RFC 4364, incorporated above.

Cloud exchange point 303 may forward and apply NAT service 719 to downstream service traffic from PE 312A, intended for customer network 308A, as follows. PE 304A receives a service packet on aggregation link 322A. The packet has a destination address that is a cloud exchange point 303 address drawn from address pool 720. VRF 730A associated with aggregation link 322A stores a route for the destination address that specifies an address for the NAT service 719 device, and PE 304A tunnels the packet using VRF 730A to the NAT service 719 device for application of the NAT service.

NAT service 719 uses address mappings 722 dynamically provisioned for routes for customer network 308A and received from PE 302A to perform NAT and replace the service packet destination address with a destination address in customer network 308A. The NAT service 719 device may determine in ingress service VRF 712 the labeled route to PE 302A (the label identifying VRF 710) and tunnel the modified service packet PE 302A, which may identify VRF 710 from the label attached to the modified service packet. PE 302A forwards the modified service packet to PE 310 via access link 316B. In this way, cloud exchange point 303 provides a NAT service to the customer to separate the customer from the cloud service layer. In a similar way, the cloud exchange point 303 may apply NAT to upstream traffic to separate cloud service providers from the cloud or network access layer by which customer networks access the cloud exchange point.

Figure 6:
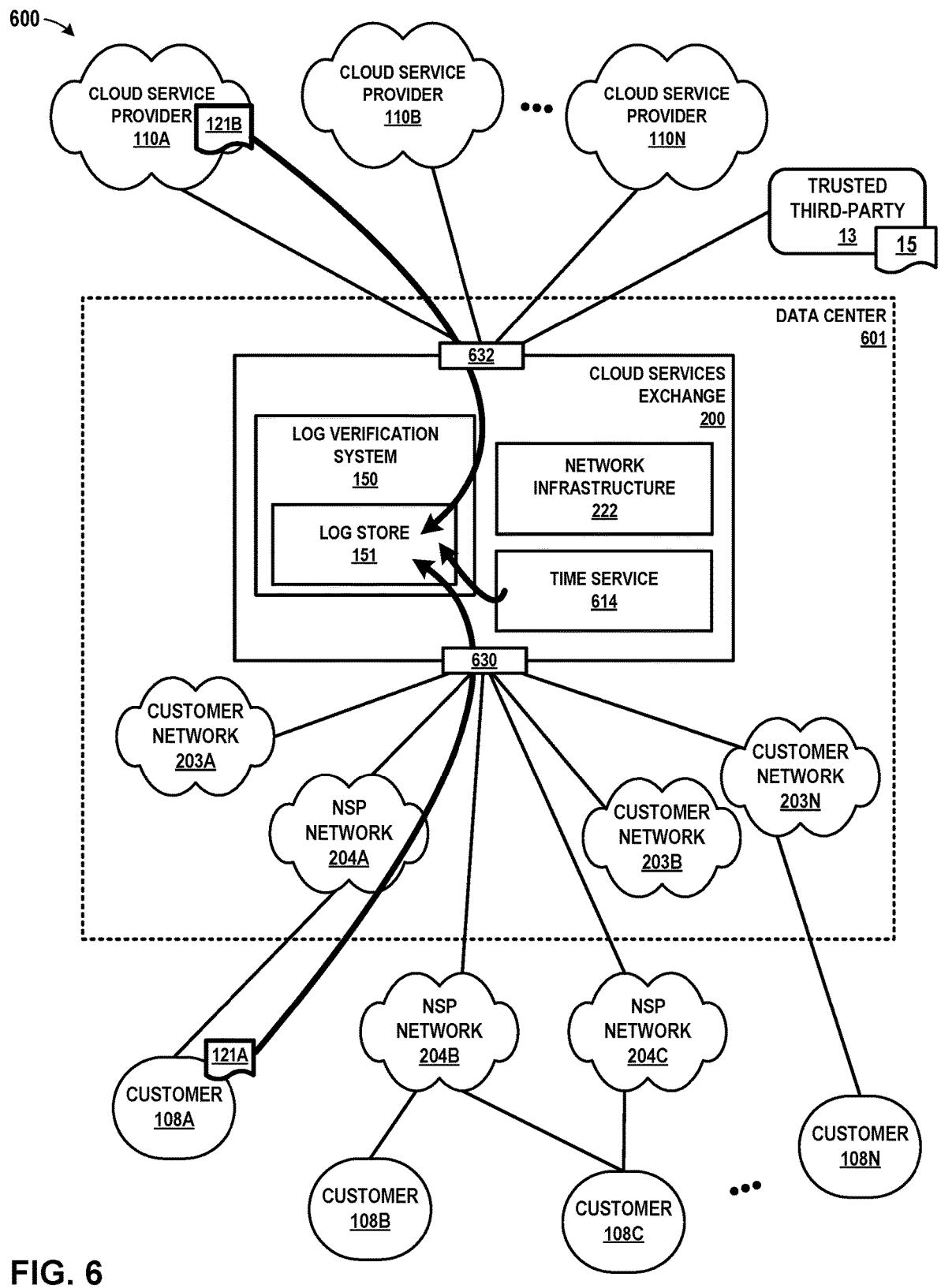
FIG. 6 is a block diagram illustrating an example system for log verification, in accordance with one or more aspects of the present disclosure.

FIG. 6 is a block diagram illustrating an example system for log verification, in accordance with one or more aspects of the present disclosure. FIG. 6 illustrates data center 601 of system 600. Data center 601 includes cloud services exchange 200 (or "cloud exchange 200"). Cloud services exchange 200 communicates with any number of cloud service provider networks, including cloud service provider networks 110A through 110N (collectively "cloud service provider networks 110") over CSP ports 632 using a communication channel, which may be private communication channel such as a virtual circuit.

System 600 further includes customer networks 203A, 203B, through 203N (collectively "customer networks 203," which represent any number of customer networks), and network service provider (NSP) networks 204A, 204B, 204C, through 204N (collectively "NSP networks 204," which represent any number of NSP networks). Some of customer networks 203 may be included within or colocated within data center 601, and other customer networks 203 may be located outside of data center 601 but may access data center 601 through an external connection or through one or more NSP networks 204. Similarly, some of NSP networks 204 may be included within or colocated within data center 601 (e.g., NSP network 204A), and other NSP networks 204 may be located outside of data center 601 (e.g., NSP network 204B) but may access or communicate with data center 601 through an external connection. Each of customer networks 203 and/or NSP networks 204 may communicate with cloud services exchange 200 through customer ports 630 using a communication channel, which may be a private communication channel such as a virtual circuit.

One or more customers 108, such as customers 108A, 108B, 108C, through 108N (collectively "customers 108") may have corresponding devices each operated by cloud customers and may receive services on behalf of or for the benefit of such customers from cloud services exchange 200, data center 601, and/or cloud service provider networks 110. In some examples, computing devices of each of customers 108 may access services of cloud services exchange 200 through a service interface or API that may be integrated into a programmable network platform or through a service interface or API for log verification system 150. Such a service interface may be similar to service interface 114 of FIG. 1 and/or FIG. 2. A programmable network platform (not shown in FIG. 6) implemented within FIG. 6 may correspond to or be similar to programmable network platform 120 of FIG. 1 and/or FIG. 2.

Customer network 203A and customer 108A are considered to be associated with the same customer (e.g., "customer A"), and customer network 203B and customer 108B are likewise assumed to be associated with the same customer (e.g., "customer B"). A similar convention applies to other customer networks 203 and customers 108 for any number of N customers.

As with cloud exchange 100 of FIG. 1, cloud services exchange 200 may provide customers of the exchange (e.g., enterprises, network carriers, network service providers, and SaaS customers), with secure, private, virtual connections to multiple cloud service providers (CSPs) globally. Each of cloud service provider networks 110 may participate in the cloud exchange by virtue of their having at least one accessible port in the cloud exchange by which one or more customers 108, customer networks 203, and/or NSP networks 204 can connect to the one or more cloud services offered by cloud service provider networks 110, e.g., using a virtual circuit provided by the cloud services exchange 200. Cloud services exchange 200 may allow private networks of customers to be directly cross-connected to other customers at a common point, thereby allowing direct exchange of network traffic between the networks of the customers.

Cloud services exchange 200 includes network infrastructure 222 log verification system 150, and time service 614. Network infrastructure 222 may correspond to network infrastructure 222 of FIG. 2 and may provide a L2/L3 switching fabric by which cloud service provider networks 110 and customers/NSPs interconnect, thereby enabling an NSP/customer to have options to create many-to-many interconnections with a one-time hook up to the switching network and underlying network infrastructure 222 that presents an interconnection platform for cloud exchange 200. Cloud exchange 200 may thereby allow customers to interconnect to multiple cloud service provider networks 110 and cloud services using network infrastructure 222 within data center 601. Log verification system 150 may correspond to log verification system 150 of FIG. 1 and may provide log management and verification services, such as storage, use, reading, verification, or other operations relating to one or more logs stored to log store 151. The cloud exchange 200 provider may also provision and manage log verification system 150 of the cloud exchange 200. As used herein, operations attributed to cloud exchange 200 may include operations of log verification system 150 of the cloud exchange 200.

Time service 614 provides timing information, which may include a current date and time. Time service 614 may provide an API by which log verification system 150 may obtain a current date and time, which log verification system 150 may append to log records received from any of the parties or generated by log verification system 150.

For ease of illustration, only a limited number of cloud service provider networks 110, data centers 601, cloud services exchanges 200, customer networks 203, NSP networks 204, customers 108, and other components or devices are shown within FIG. 6 and/or in other illustrations referenced herein. However, techniques in accordance with one or more aspects of the present disclosure may be performed with many more of such systems, and collective references to components, devices, modules, and/or systems may represent any number of such components, devices, modules, and/or systems.

Cloud service provider 110A is a first party that sends, via a connection to one of provider ports 632, a log record 121B and zero-knowledge proof in association to log verification system 150 for storage to log store 151. Customer 108A is a second party that sends, via a connection to one of customer ports 630, a log record 121A and zero-knowledge proof in association to log verification system 150 for storage to log store 151. Log verification system 150 may store log record 121A and log record 121B in a single block that is digitally-signed by trusted third-party 13.

In some cases, log verification system 150 receives and stores respective zero-knowledge proofs for parties. In response to receiving log record 121B, for example, log verification system 150 may append the proof generated by cloud service provider 110A to the log record 121B to create a provable log record, and store the provable log record to log store 151. Log verification system 150 may also append a timestamp, obtained from time service 614, to each log record 121 received and stored to log store 151.

Figure 7A:
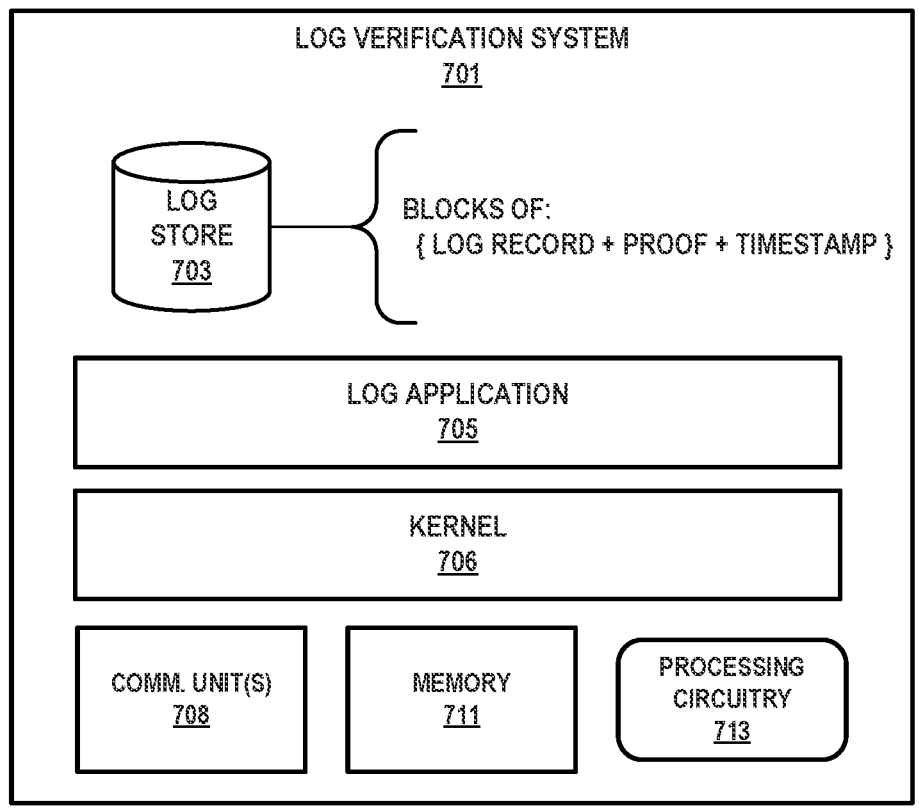
FIG. 7A is a block diagram illustrating an example log verification system in accordance with techniques described in this disclosure.

FIG. 7A is a block diagram illustrating an example log verification system in accordance with techniques described in this disclosure. Log verification system 701 may represent one or more real and/or virtual server devices or other computing devices. Log verification system includes a software stack including kernel 706 and log application 705. Kernel 808 may represent a Linux or other operating system kernel.

Memory 711 may store information for processing during operation of the stack. In some examples, memory 711 may include temporary memories, meaning that a primary purpose of the one or more storage devices is not long-term storage. Memory 711 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Memory 711, in some examples, also include one or more computer-readable storage media. Memory 711 may be configured to store larger amounts of information than volatile memory. Memory 711 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Memory 711 may store program instructions and/or data associated with one or more of the modules described in accordance with one or more aspects of this disclosure.

Processing circuitry 713 and memory 711 may provide an operating environment or platform for kernel 706 and log application 705, which may be implemented as software, but may in some examples include any combination of hardware, firmware, and software. Processing circuitry 713 may execute instructions and memory 711 may store instructions and/or data of one or more modules. The combination of processing circuitry 713 and memory 711 may retrieve, store, and/or execute the instructions and/or data of one or more applications, modules, or software. Processing circuitry 713 and memory 711 may also be operably coupled to one or more other software and/or hardware components, including, but not limited to, one or more of the components illustrated in FIG. 7A.

One or more communication units 708 of log verification system 701 may communicate with devices external to log verification system 701 by transmitting and/or receiving data, and may operate, in some respects, as both an input device and an output device. In some examples, communication units 708 may communicate with other devices over a network. In other examples, communication units 708 may send and/or receive radio signals on a radio network such as a cellular radio network. Examples of communication units 708 include a network interface card (e.g. such as an Ethernet card), an optical transceiver, a radio frequency transceiver, a GPS receiver, or any other type of device that can send and/or receive information. Other examples of communication units 708 may include Bluetooth®, GPS, 3G, 4G, and Wi-Fi® radios found in mobile devices as well as Universal Serial Bus (USB) controllers and the like.

Log application 705 includes one or more hardware and/or software processes for performing operations attributed to a log verification system 150 as described herein. Log store 703 may represent a file, a local or remote database, a blockchain, consensus network storage, and/or a Merkle tree or other data structure, for instance. Log store 703 is an example instance of any of log stores 151 described herein.

Figure 7B:
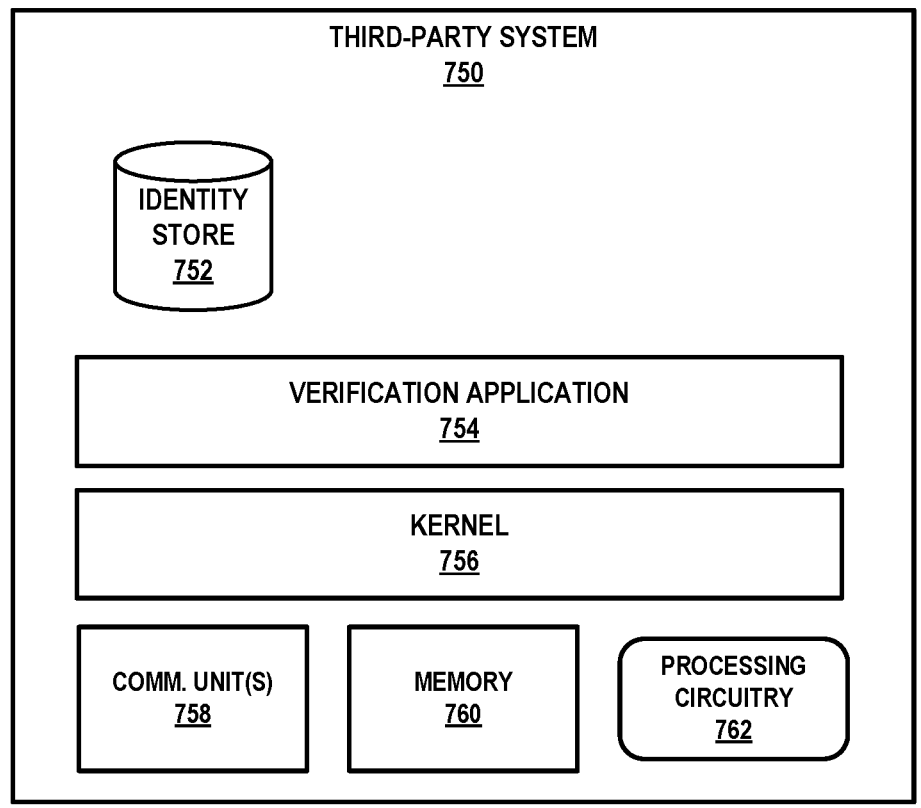
FIG. 7B is a block diagram illustrating an example third-party system in accordance with techniques described in this disclosure.

FIG. 7B is a block diagram illustrating an example third-party system in accordance with techniques described in this disclosure. Third-party system 750 may represent one or more real and/or virtual server devices or other computing devices deployed by trusted third-party 13. Third-party system 750 includes a software stack including kernel 756 and verification application 754. Kernel 756 may represent a Linux or other operating system kernel.

Memory 760 may store information for processing during operation of the stack. In some examples, memory 760 may include temporary memories, meaning that a primary purpose of the one or more storage devices is not long-term storage. Memory 760 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Memory 760, in some examples, also include one or more computer-readable storage media. Memory 760 may be configured to store larger amounts of information than volatile memory. Memory 760 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Memory 760 may store program instructions and/or data associated with one or more of the modules described in accordance with one or more aspects of this disclosure.

Processing circuitry 762 and memory 760 may provide an operating environment or platform for kernel 706 and verification application 754, which may be implemented as software, but may in some examples include any combination of hardware, firmware, and software. Processing circuitry 762 may execute instructions and memory 760 may store instructions and/or data of one or more modules. The combination of processing circuitry 762 and memory 760 may retrieve, store, and/or execute the instructions and/or data of one or more applications, modules, or software. Processing circuitry 762 and memory 760 may also be operably coupled to one or more other software and/or hardware components, including, but not limited to, one or more of the components illustrated in FIG. 7B.

One or more communication units 758 of third-party system 750 may communicate with devices external to third-party system 750 by transmitting and/or receiving data, and may operate, in some respects, as both an input device and an output device. In some examples, communication units 758 may communicate with other devices over a network. In other examples, communication units 758 may send and/or receive radio signals on a radio network such as a cellular radio network. Examples of communication units 758 include a network interface card (e.g. such as an Ethernet card), an optical transceiver, a radio frequency transceiver, a GPS receiver, or any other type of device that can send and/or receive information. Other examples of communication units 758 may include Bluetooth®, GPS, 3G, 4G, and Wi-Fi® radios found in mobile devices as well as Universal Serial Bus (USB) controllers and the like.

Verification application 754 includes one or more hardware and/or software processes for performing operations attributed to any of the trusted third parties 13 as described herein. Identity store 752 may represent a file, a local or remote database, a blockchain, consensus network storage, and/or an identity chain such as a consortium identity chain, for instance. Identity store 752 is an example instance of any of identity stores 15 described herein.

Figure 8:
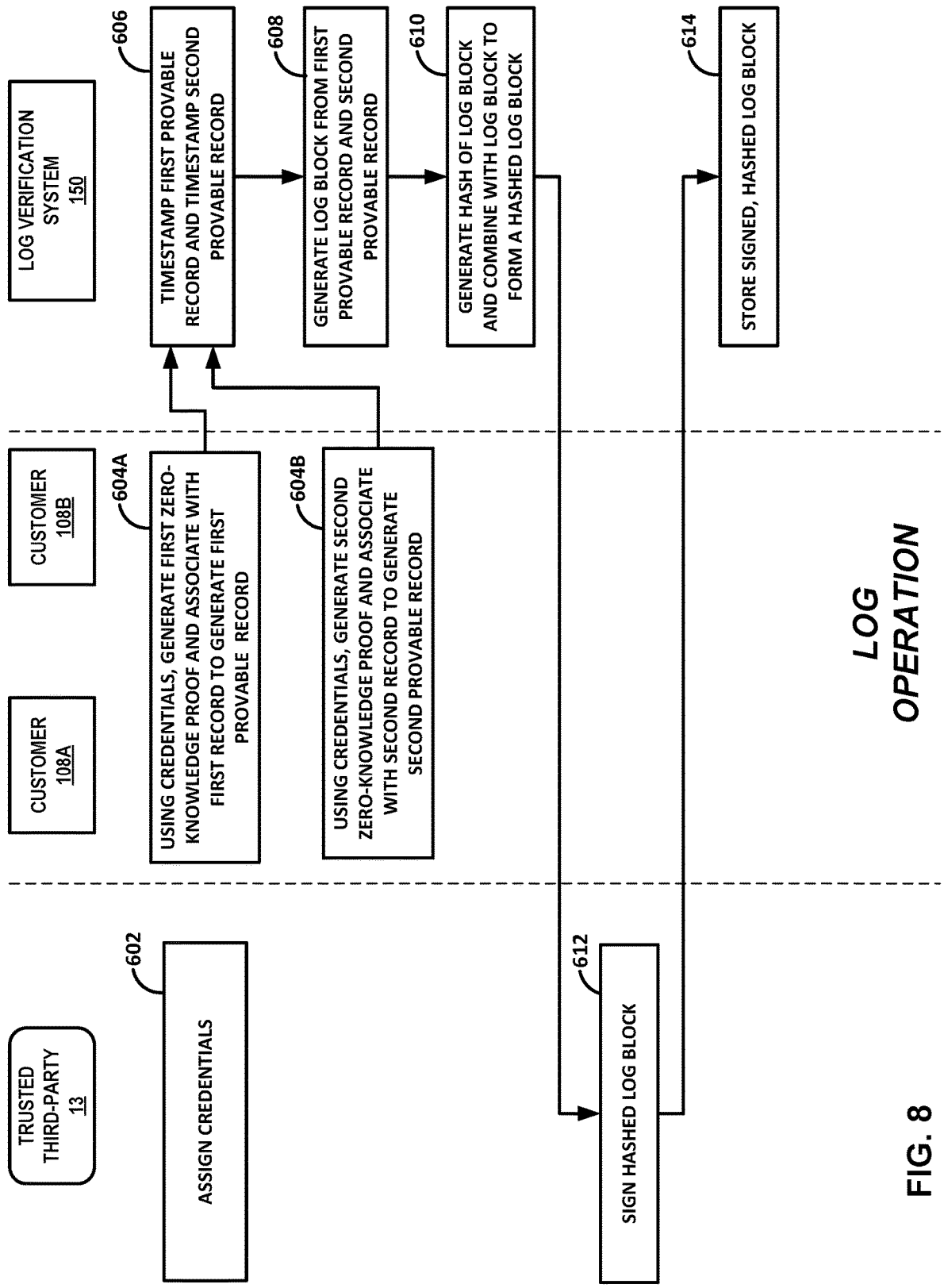
FIG. 8 is a flowchart illustrating example modes of operations for a system for storing and verifying the authenticity of log records, according to techniques described herein.

FIG. 8 is a flowchart illustrating example modes of operations for a system for storing and verifying the authenticity of log records, according to techniques described herein. A computing device associated with a trusted third-party 13 generates and assigns respective credentials to parties, in this case to customer 108A and customer 108B (602). The credentials are usable for generating zero-knowledge proofs. Trusted third-party 13 may be a steward of a consortium identity chain from which the trusted third-party 13 may invite customer 108A and customer 108B to request and obtain respective credentials. An example operation for assigning credentials is described with respect to FIG. 9.

Using credentials assigned to customer 108A, a computing device associated with customer 108A generates a first zero-knowledge proof and associates the first zero-knowledge proof with a first log record to generate a first provable log record (604A). Using a similar process, using credentials assigned to customer 108B, a computing device associated with customer 108B generates a second zero-knowledge proof and associates the second zero-knowledge proof with a second log record to generate a second provable log record (604B). In some examples, customer 108A sends the first zero-knowledge proof to log verification system 150, which attaches the first zero-knowledge proof to the first log record received from a computing device associated with customer 108A to create the first provable log record. In such examples, customer 108B sends the second zero-knowledge proof to log verification system 150, which attaches the second zero-knowledge proof to the second log record received from a computing device associated with customer 108B to create the second provable log record. A provable log record is an association of a log record and a zero-knowledge proof for the party that should be attested to with respect to the log record.

To generate the first zero-knowledge proof using the credentials, the computing device associated with customer 108A (as the prover), takes as input the proving key $P_{k1}$ of the credentials, an input $x_1$ that may be a public key for customer 108A (which may be obtained from a DID document for customer 108A), and witness $w_1$. Witness $w_1$ may be the DID or other identifier for customer 108A. The computing device computes the first zero-knowledge proof $prf1=P(P_{k1}, x_1, w_1)$, where prf1 is a first zero-knowledge proof that customer 108A knows the DID for customer 108A. Algorithm P (roof generation) may be any suitable P algorithm usable by a prover for generating a zero-knowledge proof. Algorithm P may be a zk-SNARK P algorithm.

To generate the second zero-knowledge proof using the credentials, the computing device associated with customer 108B (as the prover), takes as input the proving key $P_{k2}$ of the credentials, an input $x_2$ that may be a public key for customer 108B (which may be obtained from a DID document for customer 108B), and witness $w_2$. Witness $w_2$ may be the DID for customer 108B. The computing device computes the second zero-knowledge proof $prf2=P(P_{k2}, x_2, w_2)$, where prf2 is a second zero-knowledge proof that customer 108B knows the DID for customer 108B.

Log verification system 150 receives the first provable log record and timestamps it with first timing information, e.g., from a timing service, and log verification system 150 receives the second provable log record and timestamps it with second timing information (606). Log verification system 150 may in some cases also apply a blinding mask to the timestamped provable log records to increase entropy. Log verification system 150 generates a log block from the timestamped first provable log record and the timestamped second provable log record (608). For example, log verification system 150 may generate a log block that includes block of such records, e.g., for insertion into a Merkle tree or other data structure. Log verification system 150 may in some cases also apply a blinding mask to the log block to increase entropy. Log verification system 150 generates a hash of the log block and combines the hash with the log block to form a hashed log block (610).

Log verification system 150 may send a request for the hashed log block to be digitally signed by a trusted third-party 13 computing system (612). To digitally sign the log block, a trusted third-party 13 may compute a digital signature using a cryptographic key, either of the log block as a whole or of the hash of the log block. Trusted third-party 13 returns the digital signature to log verification system 150. Log verification system 150 then stores the signed, hashed log block, to log store 151. For example, log verification system 150 may append the signed, hashed log block to a hash log chain. The digital signature may be a digital signature of only the hash of the log rather than of the log block, in some examples. A signed log block refers to an association of a log block and a digital signature of the log block (again, either of the hash or the log block as a whole). A signed, hashed log block further includes a hash of the log block. Operation 610 is optional, and operations 612 and 614 may occur without respect to a hash of the log block in some examples.

Figure 9:
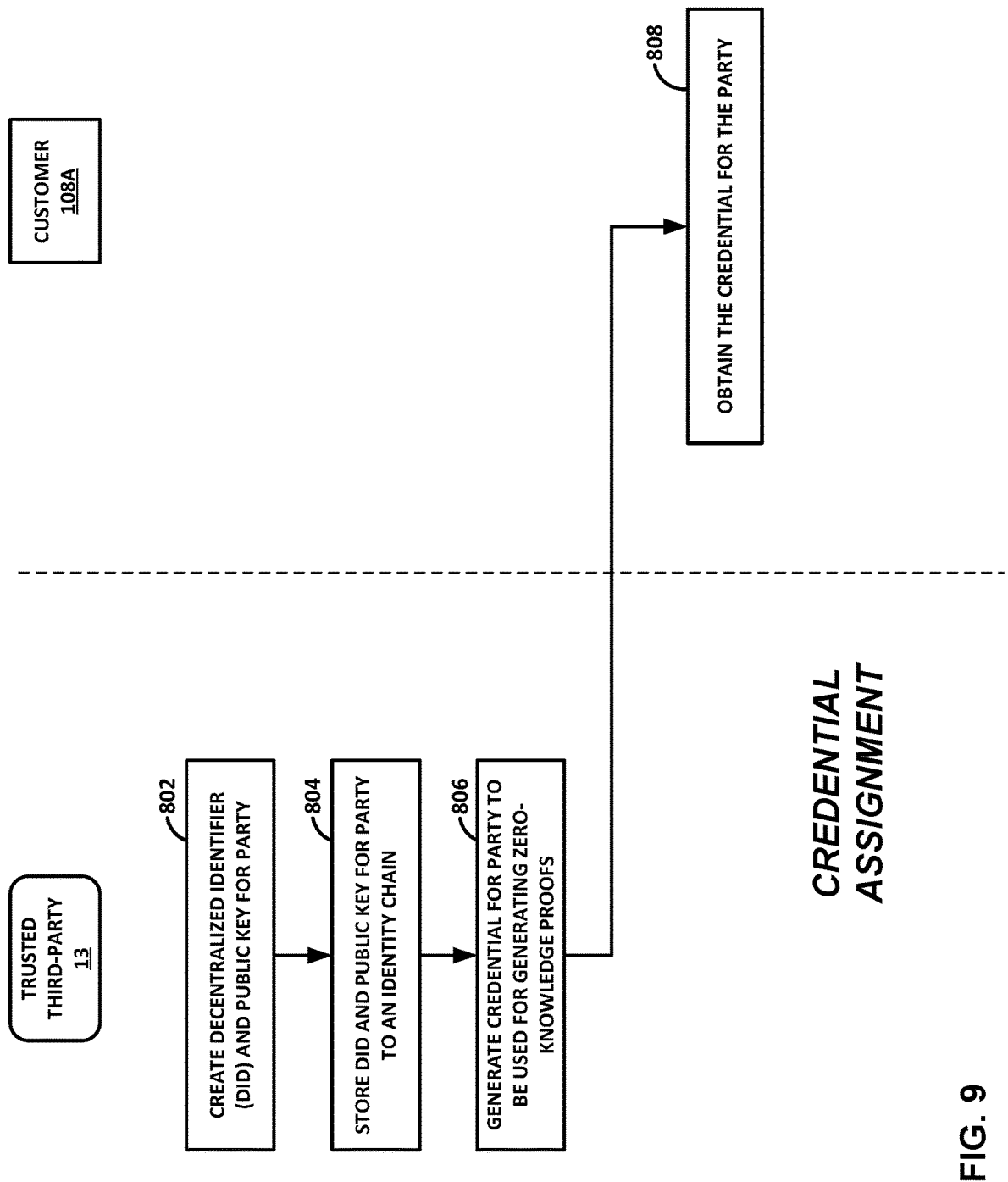
FIG. 9 is a flowchart illustrating example modes of operations for a system for assigning credentials to parties for participation in a log verification scheme, according to techniques described herein.

FIG. 9 is a flowchart illustrating example modes of operations for a system for assigning credentials to parties for participation in a log verification scheme, according to techniques described herein. A computing device associated with trusted third-party 13 creates a decentralized identifier (DID) and a public key for a party (here, customer 108A) (802). Trusted third-party 13 may be a steward of an identity store 752, e.g., a consortium identity chain, and trusted third-party 13 stores the DID and public key to identity store 752 (804). The public key may also be referred to as the public part of a proof, while the zero-knowledge proof may be referred to as the private part of a proof. Trusted third-party 13 defines credentials for the log verification scheme and generates such credentials for customer 108A to be used for generating zero-knowledge proofs (806). In an example process to generate credentials, a computing device associated with trusted third-party 13 uses a key generator algorithm G for a zero-knowledge proof scheme. Algorithm G may be any suitable G algorithm for generating credentials usable by a prover for generating a zero-knowledge proof and by a verifier for verifying a proof. Algorithm G may be a zk-SNARK G algorithm. In one example, G has a secret lambda parameter and a program C and generates, as credentials, a proving key $P_k$ and a verification key $V_k$. These keys may be publicly accessible and may be a public-private key pair. Customer 108A obtains the credentials for customer 108A, and customer 108A can use $P_k$ for generating a zero-knowledge proof that customer 108A possesses the customer DID.

Figure 10:
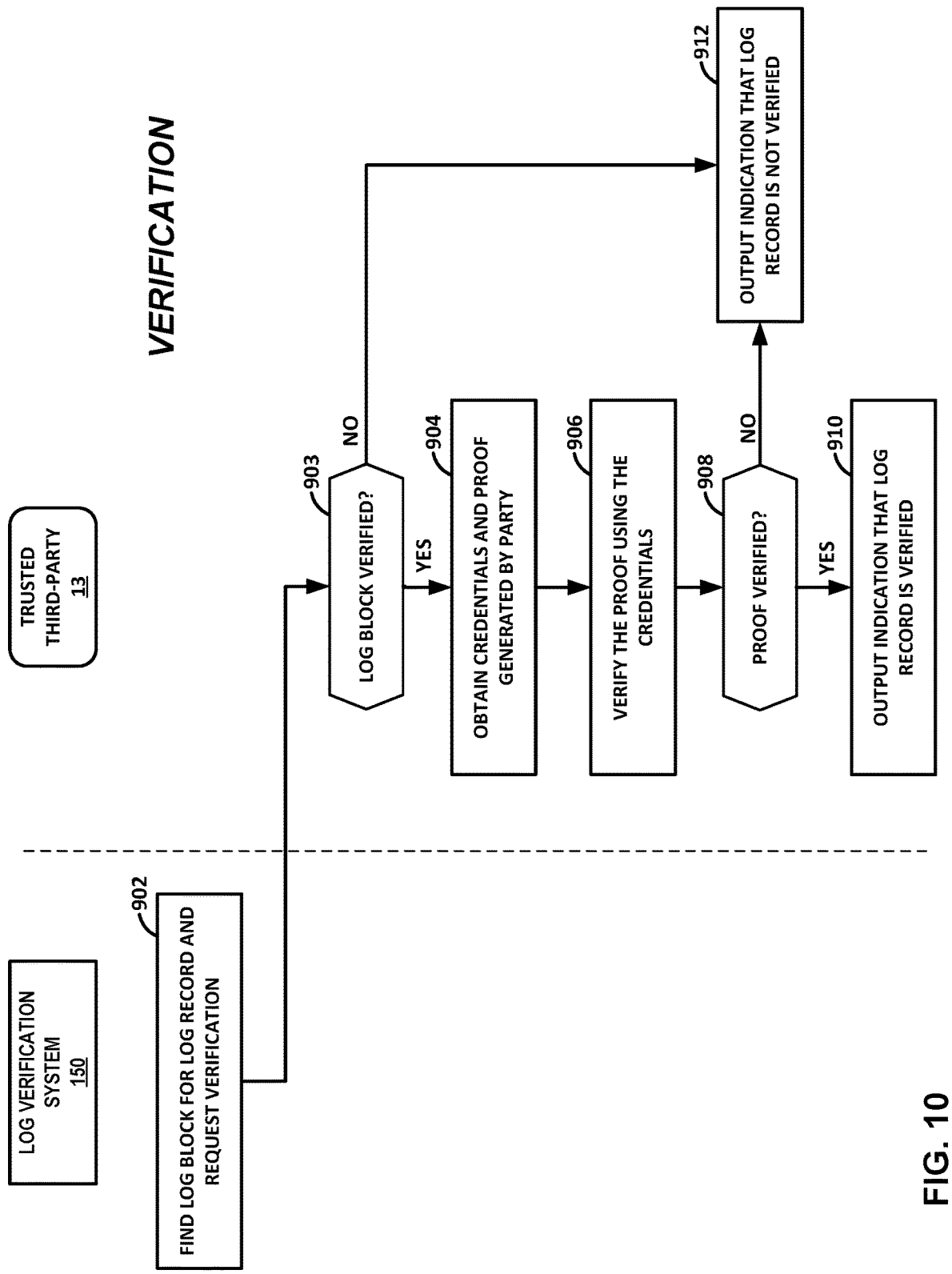
FIG. 10 is a flowchart illustrating an example mode of operation for verifying the authenticity of a log record, according to techniques of this disclosure.

FIG. 10 is a flowchart illustrating an example mode of operation for verifying the authenticity of a log record, according to techniques of this disclosure. Log verification system 150 receives a request to verify the authenticity of a log record and queries a data structure to identify and obtain the signed log block that includes the provable log record (i.e., the log record with a zero-knowledge proof appended). The request may be issued by an end-user, a party associated with the log record, an auditor or regulator, or other entity. Log verification system 150 may submit the signed log block and the log record for verification by the trusted third-party 13 (902). To verify the log block (903), trusted third-party 13 may hash the block, resign the hash value (or the log block itself), and verify that the previous signature matches the new signature, which indicates that the block has not been tampered with. In some cases, log store 151 includes a blockchain of blocks of log records and corresponding hashes in a hash chain. Trusted third-party 13 may hash the block that includes the provable log record and verify against the main blockchain to confirm the data has not been tampered with. If trusted third-party 13 is unable to verify the signed log block (NO branch of 903), trusted third-party 13 may output an indication that the log record is not verified (912).

If the signed log block is verified (YES branch of 903), trusted third-party 13 looks up the credentials for the party associated with the log record, such as by querying identity store 15 with the proof appended to the provable log record or with the public key for the part associated with the log record. (Trusted third-party 13 may receive the proof from the party as part of a protocol for assigning credentials to the party and in response to receiving the credentials and the party DID, the party may generate the proof. Trusted third-party 13 may alternatively also generate the proof. The identity store 15 stores the credentials for the party in association with the public key for the party and optionally in association with the proof.) (904). Trusted third-party 13 uses $V_k$ from the credentials and the public key for the party to verify the proof in the provable log record (906). For example, a computing device associated with trusted third-party 13 may compute algorithm V(erification) for a zero-knowledge proof scheme. Algorithm V may be any suitable V algorithm usable by a verifier that for verifying whether a proof is valid. Algorithm V may be a zk-SNARK V algorithm. The computing device computes V($V_k$, x, prf), where x is the public key for the party and prf is the proof in the provable log record. To obtain the proof, trusted third-party 13 may receive the proof from the party or generate the proof using the credentials and the party DID.

If the proof is valid (YES branch of 908), the party associated with the log record has possession of the identity of the party associated with the log records, and the computing device outputs an indication that the log record is verified as authentic (910). Otherwise (NO branch of 908), the computing device outputs an indication that the log record is not verified as authentic (912). The indication may be a message, a query response. Log verification system 150 may receive the indication and output the indication to a user (e.g., via an output device such as a display) or to another computing device for an entity that requested verification of the log record. As a result, the trusted third-party 13 operating in coordination with the log verification system 150 makes the personally-identified information for the party self-sovereign, prevents leakage of the personally-identified information, and reduces the likelihood of sophisticated attacks such as linkage attacks. In general, linkage attacks can occur when attackers are able to cross-reference the anonymized information with public information and uncover the details/identity of a party. In such cases, it is better to either use centralized sharing approach for data and/or provide the abstracted form of the anonymized information. The techniques described in this disclosure may mitigate linkage attacks using public (e.g., public key x) and private part (e.g., zero-knowledge proof) of information associated with a party, which is facilitated using Zero Knowledge Proof (zkPs) algorithms and techniques.

FIG. 1 through FIG. 6 and FIGS. 7A-7B each illustrate at least one example cloud exchange, cloud exchange point, data center, computing system or other system. The scope of this disclosure is not, however, limited to the specific systems or configurations illustrated. Accordingly, other example or alternative implementations of systems illustrated herein, beyond those illustrated in the Figures, may be appropriate in other instances. Such implementations may include a subset of the devices and/or components included in the example(s) described in the Figures and/or may include additional devices and/or components not shown in the Figures.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices are shown within the Figures and/or in other illustrations referenced herein. However, techniques in accordance with one or more aspects of the present disclosure may be performed with many more of such systems, and collective references to components, devices, modules, and/or systems may represent any number of such components, devices, modules, and/or systems.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1 and/or FIG. 7) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
receiving, by a log verification system, a first log record for a first party and a first zero-knowledge proof for the first party, wherein a trusted third-party computing system assigns a decentralized identifier for the first party and a public key for the first party and wherein the public key for the first party was used to generate the first zero-knowledge proof;
receiving, by the log verification system, a second log record for a second party and a second zero-knowledge proof for the second party;
generating, by the log verification system, a log block comprising the first log record in association with the first zero-knowledge proof and the second log record in association with the second zero-knowledge proof;
storing, by the log verification system, a signed log block comprising the log block in association with a digital signature for the log block, wherein the digital signature is received from the trusted third-party computing system;
verifying, by the trusted third-party computing system, the signed log block using the digital signature for the log block;
in response to determining that the signed log block is verified, verifying, by the trusted third-party computing system, an authenticity of the first log record using the first zero-knowledge proof and credentials for the first party, wherein the credentials for the first party were used to generate the first zero-knowledge proof; and
outputting, by the trusted third-party computing system, an indication of whether the first log record is authentic.

2. The method of claim 1, further comprising:
verifying an authenticity of the second log record using the second zero-knowledge proof and credentials for the second party, the credentials for the second party used to generate the second zero-knowledge proof; and
outputting an indication of whether the second log record is authentic.

3. The method of claim 1, further comprising:
generating, by a computing device associated with the first party, the first zero-knowledge proof for the first party using the credentials for the first party.

4. The method of claim 1, wherein storing the signed log block comprises:
storing the signed log block to a blockchain.

5. The method of claim 1, wherein generating the log block comprises:
generating, by the log verification system, the log block comprising the first log record in association with the first zero-knowledge proof and a first timestamp and the second log record in association with the second zero-knowledge proof and a second timestamp.

6. The method of claim 1, further comprising:
outputting, by the trusted third-party computing system, an indication the first log record is not authentic in response to determining the signed log block is not verified.

7. The method of claim 1, further comprising:
computing, by the trusted third-party computing system, the digital signature for the log block using a cryptographic key.

8. The method of claim 1, further comprising:
sending, by the trusted third-party computing system to the first party, the credentials for the first party and the decentralized identifier for the first party; and
obtaining, by the trusted third-party computing system, the first zero-knowledge proof for the first party and storing the first zero-knowledge proof as a stored first zero-knowledge proof,
wherein verifying the authenticity of the first log record using the first zero-knowledge proof and the credentials for the first party comprises comparing, by the trusted third-party computing system, the stored first zero-knowledge proof to the first zero-knowledge proof in association with the first log record.

9. The method of claim 1, further comprising:
sending, by the trusted third-party computing system to the first party, the credentials for the first party and the decentralized identifier for the first party; and
computing, by the trusted third-party computing system in response to a request for verification of the first log record, a computed first zero-knowledge proof for the first party using the credentials for the first party and the decentralized identifier for the first party,
wherein verifying the authenticity of the first log record using the first zero-knowledge proof and the credentials for the first party comprises comparing, by the trusted third-party computing system, the computed first zero-knowledge proof to the first zero-knowledge proof in association with the first log record.

10. The method of claim 9, further comprising:
sending, by the trusted third-party computing system, the public key for the first party to the first party.

11. The method of claim 10, further comprising:
executing a zero-knowledge proof generating algorithm to compute the first zero-knowledge proof using the public key for the first party, the credentials for the first party, and the identifier for the first party.

12. The method of claim 10,
wherein verifying an authenticity of the first log record comprises executing a zero-knowledge proof verification algorithm having inputs of the public key for the first party, the credentials for the first party, and the first zero-knowledge proof.

13. The method of claim 1, further comprising:
storing, by the trusted third-party computing system to an identity store, at least one key from the credentials for the first party, the decentralized identifier for the first party, and the public key for the first party.

14. The method of claim 1, further comprising:
computing, by the log verification system, a hash of the log block,
wherein storing the signed log block comprises storing, by the log verification system, the signed log block comprising the log block in association with the digital signature for the log block and the hash of the log block.

15. The method of claim 14, wherein the digital signature for the log block comprises a digital signature of the hash of the log block.

16. A computing system comprising:
a log verification system comprising first processing circuitry coupled to first memory, the log verification system configured to:
receive a first log record for a first party and a first zero-knowledge proof for the first party;
receive a second log record for a second party and a second zero-knowledge proof for the second party;
generate a log block comprising the first log record in association with the first zero-knowledge proof and the second log record in association with the second zero-knowledge proof; and
store a signed log block comprising the log block in association with a digital signature for the log block, the computing system further comprising:
a trusted third-party computing system comprising second processing circuitry coupled to second memory, the trusted third-party computing system configured to:
assign a decentralized identifier for the first party and a public key for the first party, wherein the public key for the first party was used to generate the first zero-knowledge proof;
output the digital signature to the log verification system;
verify the signed log block using the digital signature for the log block;
in response to a determination that the signed log block is verified, verify an authenticity of the first log record using the first zero-knowledge proof and the credentials for the first party, wherein the credentials for the first party were used to generate the first zero-knowledge proof; and
output an indication of whether the first log record is authentic.

17. The computing system of claim 16, wherein the trusted third-party computing system is further configured to:
verify an authenticity of the second log record using the second zero-knowledge proof and credentials for the second party, the credentials for the second party used to generate the second zero-knowledge proof; and
output an indication of whether the second log record is authentic.

18. The computing system of claim 16, wherein a computing device associated with the first party is configured to generate the first zero-knowledge proof for the first party using the credentials for the first party.

19. A non-transitory computer-readable storage medium configured with instructions for causing a computing system to:
receive, by a log verification system of the computing system, a first log record for a first party and a first zero-knowledge proof for the first party, wherein a trusted third-party computing system assigns a decentralized identifier for the first party and a public key for the first party and wherein the public key for the first party was used to generate the first zero-knowledge proof;
receive, by the log verification system, a second log record for a second party and a second zero-knowledge proof for the second party;
generate, by the log verification system, a log block comprising the first log record in association with the first zero-knowledge proof and the second log record in association with the second zero-knowledge proof;
store, by the log verification system, a signed log block comprising the log block in association with a digital signature for the log block, wherein the digital signature is received from the trusted third-party computing system;
verify, by the trusted third-party computing system, the signed log block using the digital signature for the log block;
in response to determining that the signed log block is verified, verify an authenticity of the first log record using the first zero-knowledge proof and credentials for the first party, wherein the credentials for the first party were used to generate the first zero-knowledge proof; and
output an indication of whether the first log record is authentic.

* * * * *